US011266952B2

(12) United States Patent
Kobayashi et al.

(10) Patent No.: US 11,266,952 B2
(45) Date of Patent: Mar. 8, 2022

(54) DEVICE AND METHOD FOR EVEN-ODD SEPARATION AND IONIZATION OF PALLADIUM ISOTOPES

(71) Applicant: RIKEN, Wako (JP)

(72) Inventors: Tohru Kobayashi, Wako (JP); Katsumi Midorikawa, Wako (JP)

(73) Assignee: RIKEN, Wako (JP)

( * ) Notice: Subject to any disclaimer, the term of this patent is extended or adjusted under 35 U.S.C. 154(b) by 185 days.

(21) Appl. No.: 16/008,843

(22) Filed: Jun. 14, 2018

(65) Prior Publication Data

US 2018/0290105 A1    Oct. 11, 2018

Related U.S. Application Data

(63) Continuation of application No. PCT/JP2016/087630, filed on Dec. 16, 2016.

(30) Foreign Application Priority Data

Dec. 17, 2015  (JP) .............................. JP2015-246175
Nov. 2, 2016   (JP) .............................. JP2016-215009

(51) Int. Cl.
  *B01D 59/34*    (2006.01)
  *B01J 19/12*    (2006.01)
  *H01S 3/00*     (2006.01)

(52) U.S. Cl.
  CPC ............ *B01D 59/34* (2013.01); *B01J 19/121* (2013.01); *H01S 3/0007* (2013.01); *Y10S 423/07* (2013.01)

(58) Field of Classification Search
  CPC ...... B01D 59/34; B01J 19/121; Y10S 423/07; H01S 3/0007

(Continued)

(56) References Cited

U.S. PATENT DOCUMENTS 3,772,519 A * 11/1973 Levy ...................... B01D 59/34
                                                    204/157.22
4,032,419 A *  6/1977 Bernstein ............... B01D 59/34
                                                    204/157.22

(Continued)

FOREIGN PATENT DOCUMENTS

JP          54-099898 A     8/1979
JP          H0286814 A      3/1990

(Continued)

OTHER PUBLICATIONS

Chen, "Laser Cleanup of Pt Group Metals," Lawrence Livermore Laboratory, Oct. 28, 1980 (Year: 1980).*

(Continued)

*Primary Examiner* — Nicholas A Smith
*Assistant Examiner* — Colleen M Raphael
(74) *Attorney, Agent, or Firm* — Volpe Koenig

(57) ABSTRACT

First and second laser beams having respective first and second wavelengths respectively excite palladium isotopes at a ground level to a first excited level then to a second excited level. At first and second excitation steps, palladium isotopes having an odd mass number are selectively excited to the second excited level, with the identity of the ion core state of each of the palladium isotopes retained between the first excited level and the second excited level. The first wavelength and the second wavelength are selected to allow the second excited level to be an autoionization level or, in a case where the second excited level is not the autoionization level, the first wavelength, the second wavelength, and a third wavelength are selected to excite the palladium isotopes at the second excited level to the autoionization level with a third laser beam having the third wavelength at a third excitation step.

11 Claims, 20 Drawing Sheets

(58) Field of Classification Search
USPC .................................................. 204/157.22
See application file for complete search history.

(56) References Cited

U.S. PATENT DOCUMENTS

| | | | |
|---|---|---|---|
| 4,302,676 A * | 11/1981 | Levin ..................... | B01D 59/34 204/157.22 |
| 4,419,582 A | 12/1983 | Janes | |
| 5,015,848 A * | 5/1991 | Bomse .................. | G01M 3/202 250/281 |
| 5,110,562 A | 5/1992 | Sasao | |
| 5,202,005 A | 4/1993 | Paisner | |
| 5,591,947 A * | 1/1997 | Andreou ................ | B01D 59/34 204/157.22 |
| 2006/0249366 A1* | 11/2006 | Hayashida ............. | B01D 59/34 204/157.2 |
| 2008/0271986 A1* | 11/2008 | Jeong .................... | B01D 59/34 204/157.22 |

FOREIGN PATENT DOCUMENTS

| | | |
|---|---|---|
| JP | 3-68420 A | 3/1991 |
| JP | 6-502348 A | 3/1994 |
| KR | 20100045616 A | 5/2010 |
| RU | 2119816 C1 | 10/1998 |
| WO | 9526584 A1 | 10/1995 |

OTHER PUBLICATIONS

Derzhiev et al, "Isotope-selective photoionisation of palladium," Quantum Electronics 33(6) 553-558 (2003) (Year: 2003).*

Derzhiev et al, "Two-step photoionization of palladium," Quantum Electronics 32(7) 619-622 (2002) (Year: 2002).*

Dujin et al, "Hyperfine structure and isotope shift measurements on 4d10 1S0 à 4d9 5p J = 1 transitions in Pd I using deep-UV cw laser spectroscopy," Eur. Phys. J. D vol. 19, pp. 25-29 (2002) (Year: 2002).*

Georgiev et al, "Study of the properties of the neutron-rich Pd isotopes," European Organization for Nuclear Physics, CERN Document Server: Preprints pp. 1-6, Sep. 2013 (Year: 2013).*

Tkachev et al, "The use of Zeeman effect for increasing the selectivity of laser isotope separation," Quantum Electronics 32(7) 614-618 (2002) (Year: 2002).*

Tkachev et al, "On laser rare-isotope separation," Quantum Electronics 33(7) 581-592 (2003) (Year: 2003).*

Angeli et al, "Table of experimental nuclear ground state charge radii: An update," Atomic Data and Nuclear Data Tables 99 (2013) 69-95 (Year: 2013).*

Kudryavtsev, "Two-step laser ionization schemes for in-gas laser ionization and spectroscopy of radioactive isotopes," Rev. Sci. Instrum. vol. 85, 02B915 (2014) (Year: 2014).*

Yakovlenko, "Producing of 168Yb of weighable amounts by AVLIS method and selective photo-ionization of palladium," Proc. SPIE 5120, XIV International Symposium on Gas Flow, Chemical Lasers, and High-Power Lasers, (Nov. 10, 2003) (Year: 2003).*

EPO search opinion, dated Jul. 26, 2019 (Year: 2019).*

PCT International Preliminary Report on Patentability, dated Jun. 19, 2018 (Year: 2018).*

Brinkmann et al, "Isotope Selective Photoionization of Calcium Using Two-Step Laser Excitation," Appl. Phys. 5, 109—i 15 (1974) (Year: 1974).*

Beutel et al, "High-resolution isotope selective laser spectroscopy of Ag2 molecules," J. Chem. Phys. 98 (4), Feb. 15, 1993 (Year: 1993).*

International Search Report issued in corresponding International Patent Appln. No. PCT/JP2016/087630 dated Mar. 21, 2017, consisting of 5 pp. (English Translation Provided).

Written Opinion issued in corresponding International Patent Appln. No. PCT/JP2016/087630 dated Mar. 21, 2017, consisting of 4 pp.

Yamaguchi, Hiromi, "Laser Isotope Separation of Palladium", PNC technical review, Dec. 1994, No. 92, pp. 59-64.

Kobayashi, Tohru, "Spectroscopic investigation of autoionizing Rydberg states of palladium accessible after odd-mass-selective laser excitation", Japanese Journal of Applied Physics, Nov. 24, 2016, No. 56, pp. 010302-1-3.

Search Report issued in corresponding European Patent Application No. 16875799.5 dated Jul. 26, 2019, consisting of 11 pp.

Locke, C.R. et al. "Selective Photoionization of Palladium Isotopes Using a Two-Step Excitation Scheme" (2017) Appl. Phs. B 123(240): 1-6.

Japanese Office Action dated Jan. 8, 2021 for Japanese Patent Application No. 2017-556476.

* cited by examiner

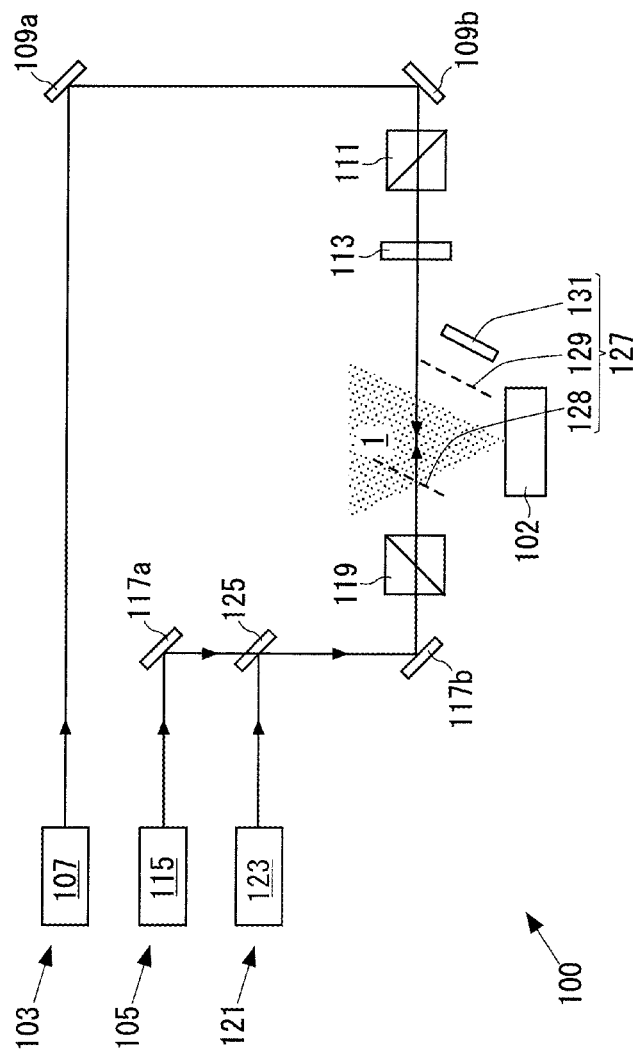

| PRINCIPAL QUANTUM NUMBER n | IONIZATION PROBABILITY |
|---|---|
| 9 | 1.00 |
| 10 | 0.73 |
| 11 | 0.55 |
| 12 | 0.42 |
| 13 | 0.33 |
| 14 | 0.27 |
| 15 | 0.22 |
| 16 | 0.18 |
| 17 | 0.15 |

| PRINCIPAL QUANTUM NUMBER n | ION INTENSITY | WAVELENGTH OF THIRD LASER BEAM |
|---|---|---|
| 9 | 1.00 | 810.8nm |
| 10 | 2.23 | 760.6nm |
| 11 | 2.33 | 730.9nm |
| 12 | 1.16 | 712.0nm |
| 13 | 1.70 | 699.1nm |
| 14 | 0.81 | 689.9nm |
| 15 | 0.65 | 682.8nm |
| 16 | 0.93 | 677.7nm |
| 17 | 0.77 | 673.6nm |

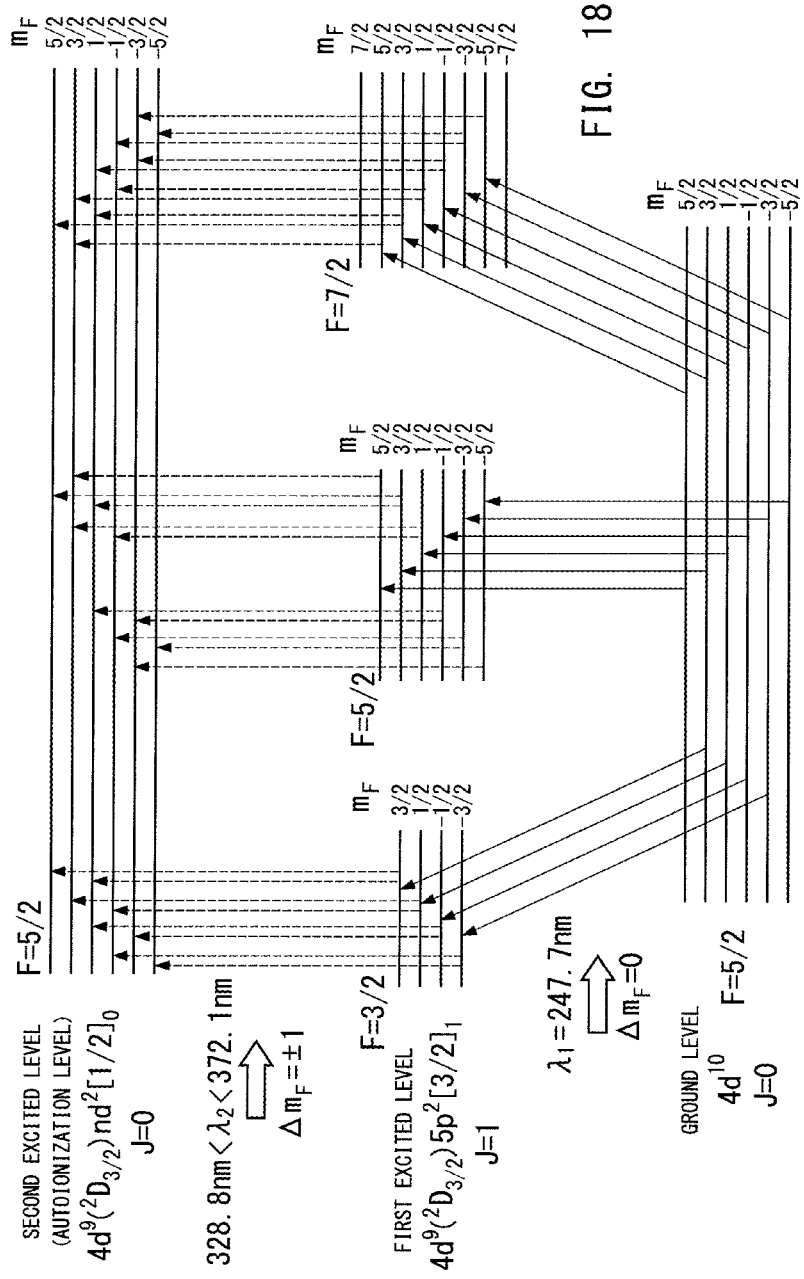

DEVICE AND METHOD FOR EVEN-ODD SEPARATION AND IONIZATION OF PALLADIUM ISOTOPES

TECHNICAL FIELD

The present invention relates to a device and a method for selectively ionizing isotopes having an odd mass number from a plurality of types of palladium isotopes.

BACKGROUND ART

Systems that reduce the radiation dose (dose) of radioactive waste and abstract an available substance as a resource from the radioactive waste, have been developed (refer to Patent Literature 1 and Non Patent Literature 1).

Abstracting radioactive palladium isotopes $^{107}$Pd from radioactive waste, enables the dose of the radioactive waste to be reduced.

In a case where radioactive waste includes $^{104}$Pd, $^{105}$Pd, $^{106}$Pd, $^{107}$Pd, $^{108}$Pd, and $^{110}$Pd, removing $^{107}$Pd from the radioactive waste enables the palladium isotopes included in the radioactive waste after that, to be rendered into resources.

CITATION LIST

Patent Literature
  Patent Literature 1: JP H07-16584 B
Non Patent Literature
  Non Patent Literature 1: http://www.jst.go.jp/impact/program08.html
  Non Patent Literature 2: "Technical Report on Isotope Separation of Palladium with Laser", Report Number PNC-TN8410 95-077, April 1995, Tokai, Power Reactor and Nuclear Fuel Development Corporation
  Non Patent Literature 3: N.KARAMATSKOS et al, "RYDBERG SERIES IN THE PHOTOIONIZATION SPECTRUM OF Pd I", PHYSICS LETTERS, volume 102A, number 9, pages 409-411 (11 June 1984)

SUMMARY OF INVENTION

Technical Problem

A method of separating palladium isotopes having an odd mass number from spent nuclear fuel (radioactive waste) in a nuclear reactor as below, has been described in Patent Literature 1 or Non Patent Literature 2. First, part of the spent nuclear fuel is collected as an undissolved residue into a filter in a reprocessing step. The undissolved residue includes palladium isotopes having an odd mass number and palladium isotopes having an even mass number. The undissolved residue is irradiated with laser beams having first to third wavelengths. At this time, the laser beam having the first wavelength (276.3 nm) excites a plurality of types of palladium isotopes $^{104}$Pd, $^{105}$Pd, $^{106}$Pd, $^{107}$Pd, $^{108}$Pd, and $^{110}$Pd included in the undissolved residue to a first excited level. The laser beam having the second wavelength (521.0 nm) selectively excites the palladium isotopes $^{105}$Pd and $^{107}$Pd having an odd mass number, from the plurality of types of palladium isotopes at the first excited level, to a second excited level. Furthermore, the laser beam having the third wavelength ionizes $^{105}$Pd and $^{107}$Pd at the second excited level. The palladium ions generated in this manner are separated from neutral other types of palladium isotopes by an electric field.

In a case where palladium isotopes having an odd mass number, are selectively ionized from a substance (e.g., the above radioactive waste or a natural substance) including a plurality of types of palladium isotopes, it is desirable that the ionization is performed efficiently. Note that, in a case where palladium isotopes $^{105}$Pd having an odd mass number are ionized from a natural substance, the palladium ions are abstracted from the natural substance by an electric field so as to be utilized as a resource.

An object of the present invention is to provide a device and a method capable of efficiently and selectively ionizing palladium isotopes having an odd mass number from a substance including a plurality of types of palladium isotopes.

Solution to Problem

The inventors of the present application have found that, with attention to excitation in consideration of an ion core state in a case where palladium isotopes having an odd mass number are selectively excited to an autoionization level (namely, naturally ionization level), the excitation of the palladium isotopes with the identity of the ion core state of each palladium isotope retained, allows ionization efficiency to increase.

That is, the inventors have proved that the palladium isotopes transition easily, due to laser irradiation, between energy levels at which the ion core state remains the same. Patent Literature 1, Non Patent Literature 1, Non Patent Literature 2, and Non Patent Literature 3 do not describe such an ion core state itself and the consideration thereof. The present invention is based on the attention and the verification.

In order to achieve the object, according to the present invention, a method for even-odd separation and ionization of palladium isotopes including: irradiating a palladium-containing substance including a plurality of types of palladium isotopes, with laser beams having a plurality of wavelengths, to selectively ionize palladium isotopes having an odd mass number from the palladium-containing substance, the method for even-odd separation and ionization of palladium isotopes includes:
  a first excitation step of exciting, with a first laser beam having a first wavelength, the palladium isotopes at a ground level to a first excited level; and
  a second excitation step of exciting, with a second laser beam having a second wavelength, the palladium isotopes at the first excited level to a second excited level.

At the first excitation step and the second excitation step, the palladium isotopes having an odd mass number, are selectively excited to the second excited level, with identity of an ion core state of each of the palladium isotopes having an odd mass number, retained between the first excited level and the second excited level, and
  (A) the first wavelength and the second wavelength are selected to allow the second excited level to be an autoionization level, or
  (B) in a case where the second excited level is not the autoionization level, the first wavelength, the second wavelength, and a third wavelength are selected to excite the palladium isotopes at the second excited level to the autoionization level, with a third laser beam having the third wavelength at a third step.

In order to achieve the object, according to the present invention, an even-odd separation and ionization device of palladium isotopes configured to irradiate a palladium-containing substance including a plurality of types of palladium isotopes, with laser beam having a plurality of wavelengths, to selectively ionize palladium isotopes having an odd mass number from the palladium-containing substance, the even-odd separation and ionization device of palladium isotopes includes:

a first laser irradiating device configured to irradiate the palladium-containing substance with a first laser beam having a first wavelength, to excite the palladium isotopes at a ground level to a first excited level; and a second laser irradiating device configured to irradiate the palladium-containing substance with a second laser beam having a second wavelength, to excite the palladium isotopes at the first excited level to a second excited level.

The first laser beam and the second laser beam selectively excite the palladium isotopes having an odd mass number, to the second excited level, with identity of an ion core state of each of the palladium isotopes retained between the first excited level and the second excited level, and (A) the first wavelength and the second wavelength are selected to allow the second excited level to be an autoionization level, or (B) in a case where the second excited level is not the autoionization level, the first wavelength, the second wavelength, and a third wavelength are selected to allow the first laser beam, the second laser beam, and a third laser beam to excite the palladium isotopes to the autoionization level, with a third laser irradiating device configured to irradiate the palladium-containing substance with the third laser beam having the third wavelength, to excite the palladium isotopes at the second excited level to the autoionization level.

Advantageous Effects of Invention

According to the present invention, the first laser beam having the first wavelength and the second laser beam having the second wavelength, selectively excite the palladium isotopes having an odd mass number from the plurality of types of palladium isotopes, to the second excited level through the first excited level. The second excited level is the autoionization level. Otherwise, the third laser beam having the third wavelength excites the palladium isotopes at the second excited level to the autoionization level.

In a case where the palladium isotopes are excited at the two stages or the three stages from the ground level to the autoionization level, the ion core state of each palladium isotope remains the same at least between the first excited level and the second excited level. This arrangement enables the palladium isotopes having an odd mass number, to be excited from the first excited level to the second excited level at higher efficiency. As a result, the palladium isotopes having an odd mass number can be selectively and efficiently excited at the two stages or the three stages from the ground level to the autoionization level.

BRIEF DESCRIPTION OF DRAWINGS

FIG. 5 is a schematic diagram of an even-odd separation and ionization device of palladium isotopes, according to the first embodiment.

FIG. 18 illustrates an energy-level fine structure in which each palladium isotope having an odd mass number transitions, for exemplary two-stage excitation 4.

DESCRIPTION OF EMBODIMENTS

Preferred embodiments of the present invention will be described on the basis of the drawings. Note that common parts are denoted with the same reference signs in figures and the duplicate descriptions thereof will be omitted.

First Embodiment

An ionization method according to a first embodiment of the present invention includes selectively ionizing palladium isotopes having an odd mass number from a palladium-containing substance including a plurality of types of palladium isotopes. Examples of the plurality of types of palladium isotopes include palladium isotopes $^{102}$Pd, $^{104}$Pd, $^{105}$Pd, $^{106}$Pd, $^{107}$Pd, $^{108}$Pd, and $^{110}$Pd.

(Ionization with Three-Stage Excitation)

Figure 1:
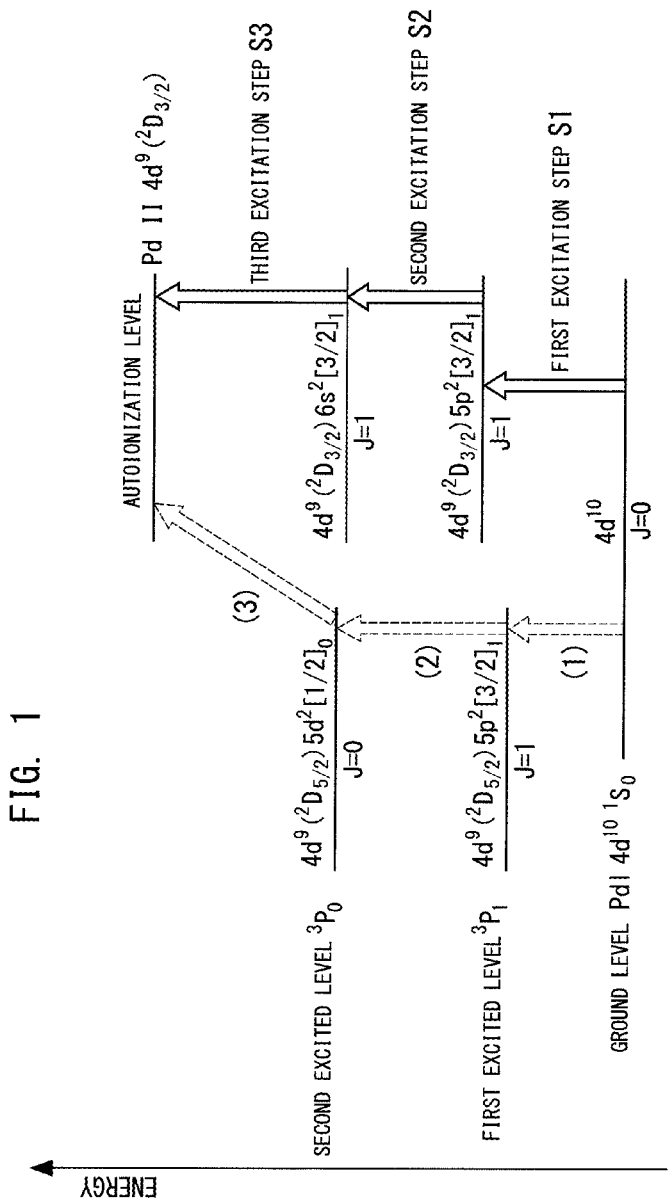
FIG. 1 is an explanatory diagram in a case where palladium isotopes having an odd mass number are excited at three stages by an ionization method according to a first embodiment of the present invention.

FIG. 1 is an explanatory diagram in a case where palladium isotopes having an odd mass number are excited at three stages by the ionization method according to the first embodiment. The three-stage excitation includes: excitation from a ground level to a first excited level, excitation from the first excited level to a second excited level, and excitation from the second excited level to an autoionization level.

As illustrated in FIG. 1, the ionization method according to the first embodiment includes first to third excitation steps S1 to S3 indicated with three solid line arrows. According to the first embodiment, the palladium-containing substance is irradiated simultaneously with first to third laser beams having first to third wavelengths, respectively, so that the first to third excitation steps S1 to S3 are generated. According to the first embodiment, in a case where the first laser beam has a wavelength of 247.7 nm and the second laser beam has a wavelength of 835.6 nm, the palladium-containing substance is irradiated with the first and second laser beams linearly polarized, the polarized direction of the first laser beam being parallel to the polarized direction of the second laser beam in the palladium-containing substance.

Figure 2A:
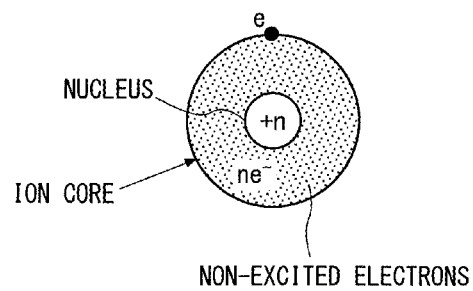
FIG. 2A is an explanatory view of an ion core.
Figure 2B:
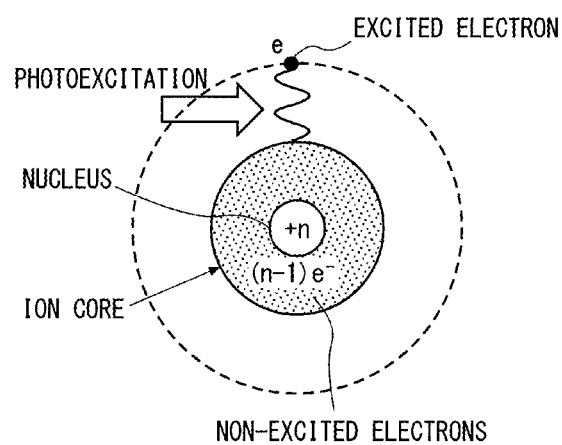
FIG. 2B is another explanatory view of the ion core.

According to the first embodiment, the ion core state of each palladium isotope having an odd mass number, remains the same in the three-stage excitation. FIGS. 2A and 2B each are an explanatory view of the ion core of a palladium isotope. FIG. 2A illustrates a case where no electron is excited by light absorption in n number of electrons included in the palladium isotope. FIG. 2B illustrates a case where one electron is excited by light absorption from the state of FIG. 2A. The ion core of a palladium isotope means, from a nucleus and a plurality of electrons included in the palladium isotope, a combination of the nucleus and the electrons excluding an electron excited by light absorption. An ion core state means the arrangement state of the electrons in the ion core. Therefore, the ion core state means the arrangement state of the n number of electrons in FIG. 2A, and the ion core state means the arrangement state of the (n−1) number of electrons in FIG. 2B. In a case where a palladium isotope is excited from the first excited level to the second excited level with the ion core state remaining the same, the arrangement state of all the electrons in the ion core of the palladium isotope remains the same between the first excited level and the second excited level.

At the first excitation step S1, the first laser beam having the first wavelength being 247.7 nm excites the palladium isotopes having an even mass number to the first excited level in addition to the palladium isotopes having an odd mass number. The state of each of the palladium isotopes having an odd mass number, excited to the first excited level, is expressed with $4d^9(^2D_{3/2})5p^2[3/2]_1$.

In this manner, the ion core state of each of the palladium isotopes having an odd mass number, excited to the first excited level, is expressed with $^2D_{3/2}$. Note that, according to the first embodiment, the "first laser beam" below means a laser beam to be used at the first excitation step S1.

At the second excitation step S2, the second laser beam having the second wavelength being 835.6 nm, selectively excites the palladium isotopes having an odd mass number from the plurality of types of palladium isotopes at the first excited level, to the second excited level. This is because each of the palladium isotopes having an odd mass number, has a nuclear spin. The nuclear spin acts on the electron orbit of the palladium atom in each of the palladium isotopes having an odd mass number, so that a fine structure occurs at the first and second excited levels. Because the fine structure exists, the first and the second laser beams enable the palladium isotopes having an odd mass number, to be excited from the first excited level to the second excited level.

In contrast to this, each of the palladium isotopes having an even mass number does not have an energy-level fine structure, so that the palladium isotopes having an even mass number cannot be excited by absorption of the second laser beam. That is, the palladium isotopes having an even mass number at the first excited level, are substantially not excited by the second laser beam to the second excited level.

The state of each of the palladium isotopes having an odd mass number, excited to the second excited level, is expressed with $4d^9(^2D_{3/2})6s^2[3/2]_1$.

At the second excitation step S2, the palladium isotopes having an odd mass number at the first excited level, are excited to the second excited level with the identity of the ion core state retained. That is, the ion core state of each of the palladium isotopes having an odd mass number at the second excited level, is identical to the ion core state of each of the palladium isotopes having an odd mass number excited to the first excited level. Note that, according to the first embodiment, the "second laser beam" below means a laser beam to be used at the second excitation step S2.

At the third excitation step S3, the third laser beam having the third wavelength excites the palladium isotopes having an odd mass number at the second excited level to the autoionization level with the identity of the ion core state retained. The third laser beam may be linearly polarized or may be circularly polarized or elliptically polarized when the palladium-containing substance is irradiated with the third laser beam. Note that, according to the first embodiment, the "third laser beam" below means a laser beam to be used at the third excitation step S3.

In this respect, the wavelength of the third laser beam (namely, the third wavelength) is selected so that the third laser beam excites the palladium isotopes having an odd mass number at the second excited level described above, to the autoionization level at which the ion core state is $^2D_{3/2}$. According to the embodiment, the autoionization level to which the third laser beam excites the palladium isotopes having an odd mass number, is an energy level having a principal quantum number n of 9 or more (hereinafter, also simply referred to as n), from Rydberg levels. With the third wavelength of preferably 652.2 nm, the palladium isotopes having an odd mass number are excited to the autoionization level at which n is 9, so that the state of each of the palladium isotopes having an odd mass number is expressed with $4d^9(^2D_{3/2})9p[3/2]_1$. Note that the autoionization level may be a Rydberg level at which n is more than 9. For example, the autoionization level may be the Rydberg level at which n is 10, 11, 12, or 13. In a case where the third wavelength is 617.9 nm, the palladium isotopes having an odd mass number are excited to the autoionization level at which n is 10, so that the state of each of the palladium isotopes having an odd mass number is expressed with $4d^9(^2D_{3/2})10p[3/2]_1$. Note that the third wavelength may be 652.5 nm. The intensity of palladium ions increases even at the wavelength.

Note that the first, second, and third laser beams having the first, second, and third wavelengths, respectively, each may have substantially intensity in a wavelength range including the wavelength. The width of the wavelength range may be 0.6 nm or more and 1.5 nm or less (e.g., approximately 0.1 nm). In this case, the laser beams each have a maximum value in intensity at a wavelength in the wavelength range, and the intensity at any wavelength in the wavelength range has a predetermined ratio or more to the maximum value (e.g., 50%, preferably 75%, and more preferably 90%). Note that the laser beams each may have a ratio smaller than the predetermined ratio to the maximum value, at any wavelength out of the wavelength range.

(Structure of Energy Level)

Figure 3:
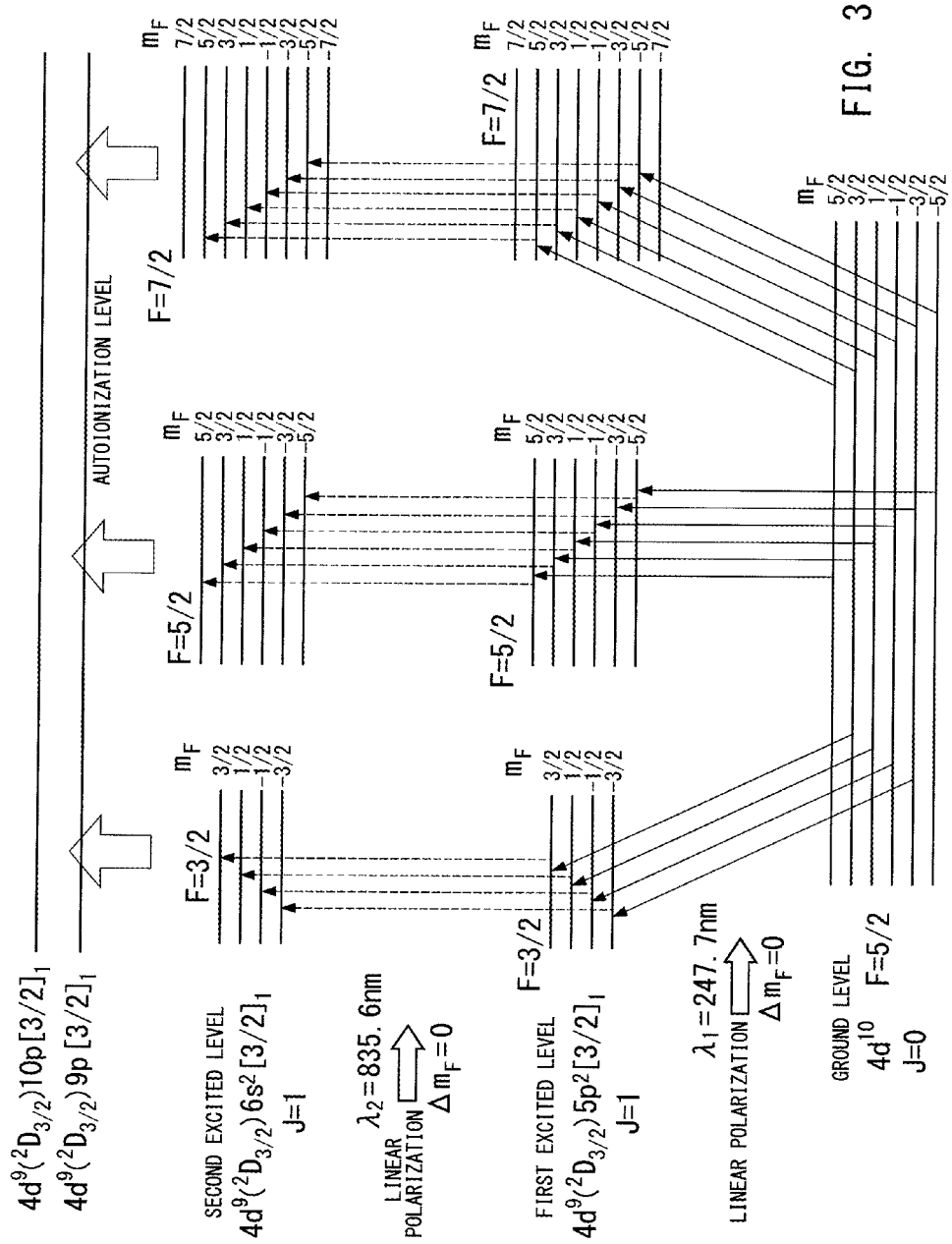
FIG. 3 illustrates an energy-level fine structure in which each palladium isotope having an odd mass number transitions in a case where first and second wavelengths are 247.7 nm and 835.6 nm, respectively.

FIG. 3 illustrates an energy-level fine structure in which each palladium isotope having an odd mass number transitions, according to the first embodiment.

The first excited level in FIG. 3 is a level to which the first laser beam having a wavelength of 247.7 nm excites a Pd isotope (palladium isotope) having an odd mass number at the ground level. The second excited level in FIG. 3 is a level to which the second laser beam having a wavelength of 835.6 nm excites the Pd isotope having an odd mass number at the first excited level in FIG. 3.

The energy level of the Pd isotope having an odd mass number has an intricate fine structure as in FIG. 3. This is because the nuclear spin I of the Pd isotope having an odd mass number is not 0 and a total angular momentum F (=J+I) divides into a large number of $m_F$ levels. The total angular momentum F divides into (2F+1) number of fine levels because the z component $m_F$ of F can have (2F+1) types of values. In FIG. 3, the excitation from the ground level to the first excited level and the excitation from the first excited level to the second excited level, each have the z component $m_F$ of F not varying ($\Delta m_F=0$).

The value of the total angular momentum F to be acquired, at the ground level (J=0), by the Pd isotope having an add mass number, is 5/2. Therefore, six fine levels at which the z component $m_F$ for F=5/2 is −5/2, −3/2, −1/2, 1/2, 3/2, or 5/2, exist at the ground level.

Three types of values of the total angular momentum F to be acquired at the first excited level (J=1) of FIG. 3, are 3/2, 5/2, and 7/2. Therefore, four fine levels, six fine levels, and eight fine levels exist for F=3/2, F=5/2, and F=7/2, respectively, at the first excited level.

Three types of values of the total angular momentum F to be acquired at the second excited level (J=1) of FIG. 3, are also 3/2, 5/2, and 7/2. Therefore, four fine levels, six fine levels, and eight fine levels also exist for F=3/2, F=5/2, and F=7/2, respectively, at the second excited level.

In FIG. 3, the excitation from the ground level to the first excited level is indicated with any of solid line arrows, and the excitation from the first excited level to the second excited level is indicated with any of broken line arrows.

(Experiment)

Figure 4A:
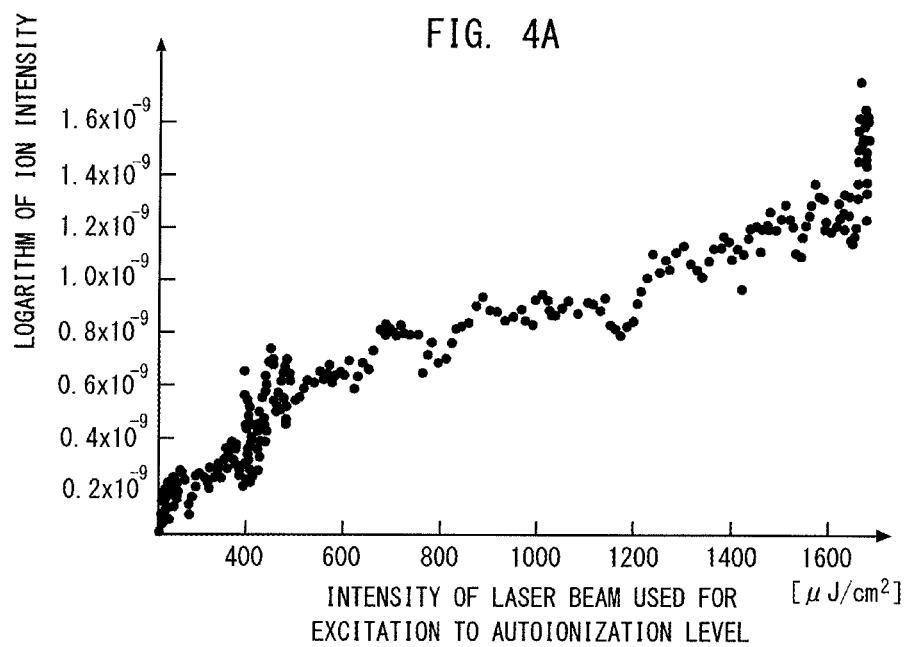
FIG. 4A illustrates an experimental result of the ionization method according to the first embodiment.

FIG. 4A illustrates an experimental result of the ionization method according to the first embodiment. FIG. 4A illustrates the intensity of ions of palladium isotopes having an odd mass number, acquired in a case where the first to third wavelengths are 247.7, 835.6, and 652.2 nm, respectively, in the ionization method according to the first embodiment described above. In FIG. 4A, the horizontal axis represents the intensity of the third laser beam, and the vertical axis represents the common logarithm of the acquired intensity (amount) of the ions of the palladium isotopes $^{105}Pd$ having an odd mass number.

Figure 4B:
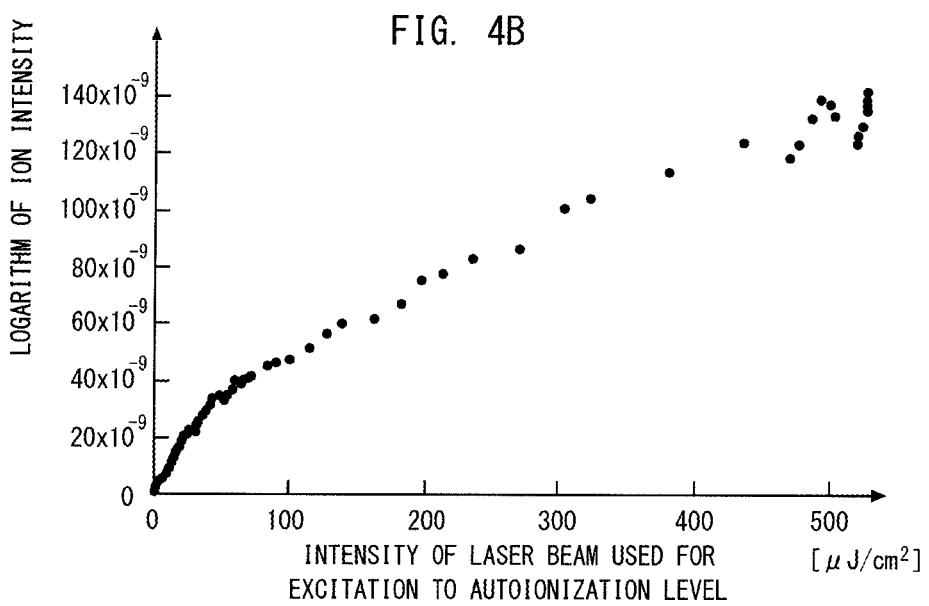
FIG. 4B illustrates an experimental result corresponding to a second embodiment.

FIG. 4B illustrates an experimental result corresponding to a second embodiment to be described. That is, FIG. 4B illustrates a case where palladium isotopes $^{105}Pd$ having an odd mass number were selectively ionized when a palladium-containing substance was irradiated simultaneously with three laser beams having wavelengths of 276.4, 521.0, and 730.9 nm, respectively. In FIG. 4B, the horizontal axis represents the intensity of the third laser beam, and the vertical axis represents the common logarithm of the acquired intensity (amount) of ions of the palladium isotopes $^{105}Pd$ having an odd mass number.

In FIG. 4B, the palladium isotopes having an odd mass number are excited to the autoionization level through paths (1) to (3) indicated with broken line arrows in FIG. 1 (refer to the second embodiment to be described later for details). Therefore, in FIG. 4B, each of the palladium isotopes having an odd mass number retains the same ion core state ($^2D_{5/2}$) between the first excited level and the second excited level, but the ion core state varies from $^2D_{5/2}$ to $^2D_{3/2}$ when each palladium isotope having an odd mass number transitions from the second excited level to the autoionization level.

The respective wavelengths of the laser beams vary between FIGS. 4A and 4B as described above, but the other conditions (e.g., laser beam intensity) remain the same. As can be seen from FIGS. 4A and 4B, according to the first embodiment of FIG. 4A, the intensity (amount) of the ionized palladium isotopes is 100 times or more as that in FIG. 4B. For example, in a case where the intensity of each laser beam used for the excitation to the autoionization level, is 300 μJ/cm$^2$, the intensity (amount) of the ionized palladium isotopes of FIG. 4A according to the first embodiment is approximately 330 times as that of FIG. 4B. In a case where the intensity of each laser beam used for the excitation to the autoionization level, is 500 μJ/cm$^2$, the intensity (amount) of the ionized palladium isotopes of FIG. 4A according to the first embodiment is approximately 260 times as that of FIG. 4B.

(Configuration of Ionization Device)

FIG. 5 illustrates the configuration of an ionization device 100 according to the first embodiment. The ionization method according to the first embodiment described above, may be performed by the ionization device 100. The ionization device 100 according to the first embodiment, includes a first laser irradiating device 103, a second laser irradiating device 105, and a third laser irradiating device 121.

In FIG. 5, a palladium-containing substance 1 may be gas. In FIG. 1, the palladium-containing substance 1 includes an object including a plurality of types of palladium isotopes (e.g., the undissolved residue of radioactive waste described above), the object being vaporized by, for example, an electron gun or a heating device. For example, a crucible 102 is disposed in a vacuum chamber and the object is put into the crucible 102, and then the object is irradiated with an electron beam. This arrangement generates the vapor of the object as the palladium-containing substance 1.

The first laser irradiating device 103 generates the first laser beam to irradiate the palladium-containing substance 1 including palladium isotopes having an odd mass number and palladium isotopes having an even mass number, with the first laser beam linearly polarized.

The second laser irradiating device 105 generates the second laser beam to irradiate the palladium-containing substance 1 with the second laser beam linearly polarized.

The first laser irradiating device 103 and the second laser irradiating device 105 are arranged so that the polarized direction of the first laser beam is parallel to the polarized direction of the second laser beam at the position of the palladium-containing substance 1. Note that each polarized direction is in the oscillating direction of an electric field.

According to the first embodiment, the first laser irradiating device 103 includes a laser emitting unit 107, a plurality of mirrors 109a and 109b, a polarizing element 111, and a polarized-direction adjusting element 113.

The laser emitting unit 107 emits the first laser beam linearly polarized. The laser emitting unit 107 is, for example, a dye laser.

The plurality of mirrors 109a and 109b each reflect the first laser beam from the laser emitting unit 107, to guide the first laser beam to the palladium-containing substance 1.

The polarizing element 111 improves the degree of linear polarization of the first laser beam emitted from the laser emitting unit 107. The polarizing element 111 may be, for example, a polarizing prism. Note that, in a case where the laser emitting unit 107 emits the laser beam not linearly polarized, the polarizing element 111 converts the first laser beam emitted from the laser emitting unit 107 into linear polarization. In a case where the laser emitting unit 107 emits the first laser beam linearly polarized, the polarizing element 111 may be omitted in FIG. 5.

The polarized-direction adjusting element 113 changes the polarized direction of the first laser beam that has passed through the polarizing element 111. This arrangement allows the polarized direction of the first laser beam linearly polarized that has passed through the polarized-direction adjusting element 113 and the polarized direction of the second laser beam, to be parallel to each other at the position of the palladium-containing substance 1. The polarized-direction adjusting element 113 may be, for example, a half-wave plate.

The second laser irradiating device 105 includes a laser emitting unit 115, a plurality of mirrors 117a and 117b, and a polarizing element 119.

The laser emitting unit 115 emits the second laser beam linearly polarized. The laser emitting unit 115 is, for example, a dye laser.

The plurality of mirrors 117a and 117b each reflect the second laser beam from the laser emitting unit 115, to guide the second laser beam to the palladium-containing substance 1.

The polarizing element 119 improves the degree of linear polarization of the second laser beam linearly polarized, emitted from the laser emitting unit 115. The polarizing element 119 may be, for example, a polarizing prism. Note that, in a case where the laser emitting unit 115 emits the second laser beam not linearly polarized, the polarizing element 119 converts the second laser beam emitted from the laser emitting unit 115 into linear polarization. In a case where the laser emitting unit 115 emits the second laser beam linearly polarized, the polarizing element 119 may be omitted in FIG. 1.

The first laser irradiating device 103 and the second laser irradiating device 105 are arranged so that the same position of the palladium-containing substance 1 is irradiated with the first and second laser beams. Therefore, as an example, with the plurality of mirrors 109a, 109b, 117a, and 117b, the first laser beam and the second laser beam travel in mutually opposite directions on the same virtual straight line penetrating the palladium-containing substance 1, to be incident on the palladium-containing substance 1.

The third laser irradiating device 121 irradiates the palladium-containing substance 1 with the third laser beam. The third laser beam excites the palladium isotopes having an odd mass number excited in the two stages by the first and second laser beams linearly polarized, to a Rydberg level having a principal quantum number n of 9 or more. This arrangement allows the palladium isotopes having an odd mass number, to be ionized automatically.

In the example of FIG. 5, the third laser irradiating device 121 includes: a laser emitting unit 123 that emits the third laser beam; and a mirror 125. The third laser beam from the laser emitting unit 123 is reflected on the mirror 125, to be incident on the mirror 117b. The mirror 125 is a dichroic mirror that reflects light having a specific wavelength and transmits light having the other wavelengths, therethrough. That is, the dichroic mirror 125 transmits the second laser beam therethrough and reflects the third laser beam. This arrangement allows the second and third laser beams to overlap each other in order to propagate through the same path. Then, the second and third laser beams are reflected on the mirror 117b to be incident on the palladium-containing substance 1.

The ionization device 100 may include a collection device 127. The collection device 127 collects the ionized palladium isotopes into a desirable location. The collection device 127 includes, for example, a metal electrode 128, a metal-gauze electrode 129, and a collection substrate 131. Because of the metal-gauze electrode 129 grounded and application of a positive voltage to the metal electrode 128, the ionized palladium isotopes pass through the metal-gauze electrode 129 to accumulate on the collection substrate 131.

(Another Exemplary Wavelength 1)

The wavelength of the first laser beam (first wavelength) may be 244.9 nm and the wavelength of the second laser beam (second wavelength) may be 576.2 nm. In this case, the same descriptions as above will be omitted below.

The first laser irradiating device 103 and the second laser irradiating device 105 irradiate the same position of the palladium-containing substance 1 with the first laser beam and the second laser beam, respectively, the first laser beam and the second laser beam being linearly polarized, the polarized directions thereof being parallel to each other. This arrangement also allows the palladium isotopes having an odd mass number from the plurality of types of palladium isotopes included in the palladium-containing substance 1, to be selectively excited to the second excited level through the first excited level. At this time, the ion core state of each of the palladium isotopes having an odd mass number, remains the same between the first excited level and the second excited level.

Figure 6:
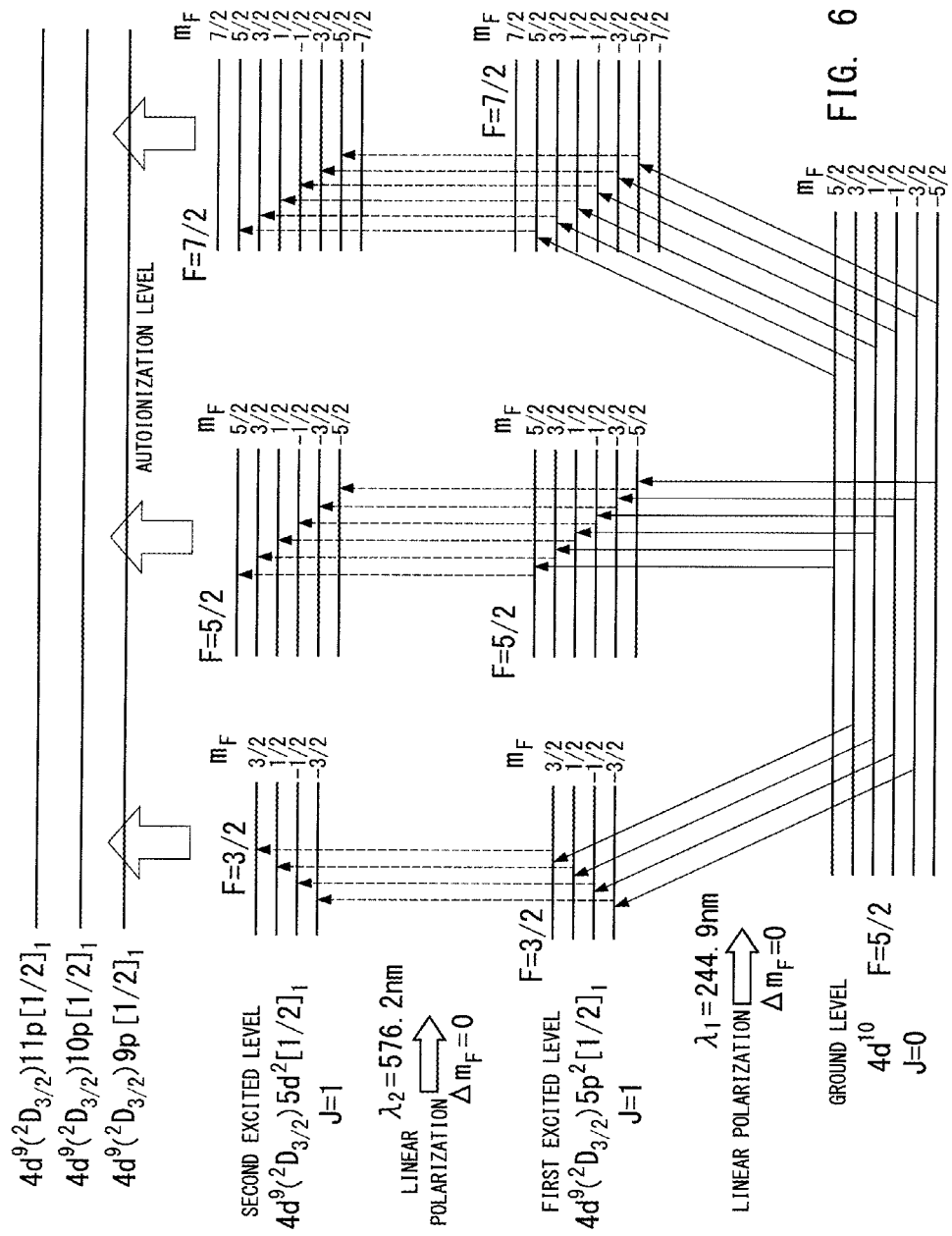
FIG. 6 illustrates an energy-level fine structure in which each palladium isotope having an odd mass number transitions in a case where the first and second wavelengths are 244.9 nm and 576.2 nm, respectively.

FIG. 6 illustrates an energy-level fine structure in which each of the palladium isotopes having an odd mass number transitions.

The first excited level in FIG. 6 is a level to which the first laser beam having a wavelength of 244.9 nm excites a Pd isotope having an odd mass number at the ground level. The second excited level in FIG. 6 is a level to which the second laser beam having a wavelength of 576.2 nm excites the Pd isotope having an odd mass number at the first excited level in FIG. 6. In FIG. 6, the excitation from the ground level to the first excited level and the excitation from the first excited level to the second excited level, each have the z component $m_F$ of F not varying ($\Delta_F = 0$).

Three types of values of the total angular momentum F to be acquired at the first excited level (J=1, $4d^9(^2D_{3/2})5p^2[1/2]_1$) of FIG. 6, are 3/2, 5/2, and 7/2. Therefore, four fine levels, six fine levels, and eight fine levels exist for F=3/2, F=5/2, and F=7/2, respectively, at the first excited level.

Three types of values of the total angular momentum F to be acquired at the second excited level (J=1, $4d^9(^2D_{3/2})5d^2[1/2]_1$) of FIG. 6, are also 3/2, 5/2, and 7/2. Therefore, four fine levels, six fine levels, and eight fine levels also exist for F=3/2, F=5/2, and F=7/2, respectively, at the second excited level.

In FIG. 6, the excitation from the ground level to the first excited level is indicated with any of solid line arrows, and the excitation from the first excited level to the second excited level is indicated with any of broken line arrows.

The wavelength of the third laser beam (third wavelength) is selected to satisfy the following (a) and (b), and is, for example, 1051.3, 967.7, or 920.8 nm.

(a) The third laser beam excites the palladium isotopes having an odd mass number excited to the second excited level by the first and second laser beams, to the autoionization level that is a Rydberg level having a principal quantum number n of 9 or more.

(b) The palladium isotopes having an odd mass number, to be excited to the autoionization level, each have an ion core state remaining the same between the first excited level, the second excited level, and the autoionization level.

In a case where the third wavelength is 1051.3 nm, the palladium isotopes having an odd mass number are excited to the autoionization level at which n is 9, so that the state of each of the palladium isotopes having an odd mass number is expressed with $4d^9(^2D_{3/2})9p[1/2]_1$. In a case where the third wavelength is 967.7 nm, the palladium isotopes having an odd mass number are excited to the autoionization level at which n is 10, so that the state of each of the palladium isotopes having an odd mass number is expressed with $4d^9(^2D_{3/2})10p[1/2]_1$. In a case where the third wavelength is 920.8 nm, the palladium isotopes having an odd mass number are excited to the autoionization level at which n is 11, so that the state of each of the palladium isotopes having an odd mass number is expressed with $4d^9(^2D_{3/2})11p[1/2]_1$.

(Another Exemplary Wavelength 2)

The wavelength of the first laser beam (first wavelength) may be 244.9 nm and the wavelength of the second laser beam (second wavelength) may be 560.5 nm. In this case, the same descriptions as above will be omitted below.

The first laser irradiating device 103 and the second laser irradiating device 105 irradiate the same position of the palladium-containing substance 1 with the first laser beam and the second laser beam, respectively, the first laser beam and the second laser beam being linearly polarized, the polarized directions thereof being orthogonal to each other. Alternatively, the first laser irradiating device 103 and the second laser irradiating device 105 irradiate the same position of the palladium-containing substance 1 with the first laser beam and the second laser beam, respectively, the first laser beam and the second laser beam being circularly polarized or elliptically polarized. The first and second laser beams above selectively excite the palladium isotopes having an odd mass number from the plurality of types of palladium isotopes included in the palladium-containing substance 1, to the second excited level through the first excited level. At this time, the ion core state of each of the palladium isotopes having an odd mass number, remains the same between the first excited level and the second excited level.

Figure 7:
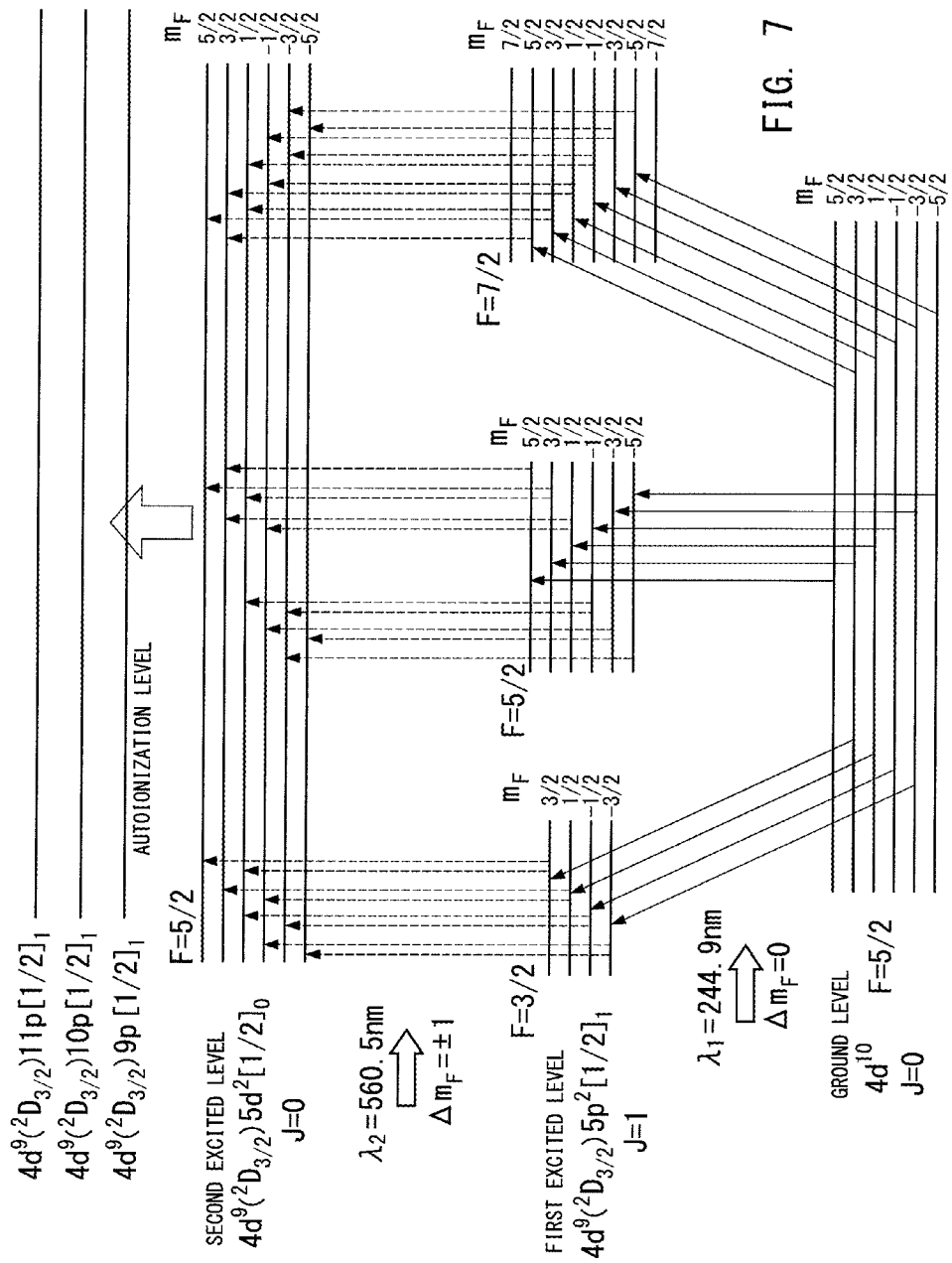
FIG. 7 illustrates an energy-level fine structure in which each palladium isotope having an odd mass number transitions in a case where the first and second wavelengths are 244.9 nm and 560.5 nm, respectively.

FIG. 7 illustrates an energy-level fine structure in which each of the palladium isotopes having an odd mass number transitions, according to the first embodiment.

The first excited level in FIG. 7 is a level to which the first laser beam having a wavelength of 244.9 nm excites a Pd isotope having an odd mass number at the ground level. The second excited level in FIG. 7 is a level to which the second laser beam having a wavelength of 560.5 nm excites the Pd isotope having an odd mass number at the first excited level in FIG. 7. In FIG. 7, the excitation from the ground level to the first excited level, has the z component $m_F$ of F not varying, and the excitation from the first excited level to the second excited level, has the z component $m_F$ of F varying by 1 ($\Delta m_F = \pm 1$).

Three types of values of the total angular momentum F to be acquired at the first excited level (J=1, $4d^9(^2D_{3/2})5p^2[1/2]_1$) of FIG. 7, are 3/2, 5/2, and 7/2. Therefore, four fine levels, six fine levels, and eight fine levels exist for F=3/2, F=5/2, and F=7/2, respectively, at the first excited level.

One type of value of the total angular momentum F to be acquired at the second excited level (J=0, $4d^9(^2D_{3/2})5d^2[1/2]_0$) of FIG. 7, is 5/2. Therefore, six fine levels exist at the second excited level.

In FIG. 7, the excitation from the ground level to the first excited level is indicated with any of solid line arrows, and the excitation from the first excited level to the second excited level is indicated with any of broken line arrows.

The wavelength of the third laser beam (third wavelength) is selected to satisfy the following (a) and (b), and is, for example, 1108.0, 1015.4, or 964.0 nm.

(a) The third laser beam excites the palladium isotopes having an odd mass number excited to the second excited level by the first and second laser beams, to the autoionization level that is a Rydberg level having a principal quantum number n of 9 or more.

(b) The palladium isotopes having an odd mass number, to be excited to the autoionization level, each have an ion core state remaining the same between the first excited level, the second excited level, and the autoionization level.

In a case where the third wavelength is 1108.0 nm, the palladium isotopes having an odd mass number are excited to the autoionization level at which n is 9, so that the state of each of the palladium isotopes having an odd mass number is expressed with $4d^9(^2D_{3/2})9p[1/2]_1$. In a case where the third wavelength is 1015.4 nm, the palladium isotopes having an odd mass number are excited to the autoionization level at which n is 10, so that the state of each of the palladium isotopes having an odd mass number is expressed with $4d^9(^2D_{3/2})10p[1/2]_1$. In a case where the third wavelength is 964.0 nm, the palladium isotopes having an odd mass number are excited to the autoionization level at which n is 11, so that the state of each of the palladium isotopes having an odd mass number is expressed with $4d^9(^2D_{3/2})11p[1/2]_1$.

(Effect according to First Embodiment)

According to the first embodiment, because the palladium isotopes having an odd mass number each retain the same ion core state $^2D_{3/2}$ during the excitation from the first excited level to the autoionization level through the second excited level, the palladium isotopes having an odd mass number can be ionized at exceedingly high efficiency. For example, as shown in the experimental result of FIG. 4A, according to the first embodiment, the palladium isotopes having an odd mass number can be selectively ionized at efficiency 100 times or more as that in a case where the ion core state varies in the excitation process.

Second Embodiment

An even-odd separation and ionization device of palladium isotopes according to a second embodiment of the present invention (hereinafter, simply referred to as an ionization device), selectively ionizes palladium isotopes having an odd mass number from a palladium-containing substance including a plurality of types of palladium isotopes. Examples of the plurality of types of palladium isotopes include palladium isotopes $^{102}$Pd, $^{104}$Pd, $^{105}$Pd, $^{106}$Pd, $^{107}$Pd, $^{108}$Pd, and $^{110}$Pd.

In a case where palladium isotopes included in a palladium-containing substance are excited to each energy level at which the principal quantum number n is 9 or more (namely, an autoionization level), from Rydberg levels, the palladium isotopes are automatically ionized with high probability (hereinafter, also, the principal quantum number n is simply expressed as n and the energy level is simply referred to as a level). The ionization device according to the second embodiment, selectively excites, from palladium isotopes having an odd mass number and palladium isotopes having an even mass number, the palladium isotopes having an odd mass number to a level at which n is 10, 11, 12, or 13.

In this case, palladium atoms excited to a level at which n is 9 or more, ionize with the highest probability, in theory. However, the inventors of the present application have found that the palladium atoms excited to the level in which n is 10, 11, 12, or 13 ionize with higher probability.
(Probability of Ionization in Theory)

Figures 8A, 8B:
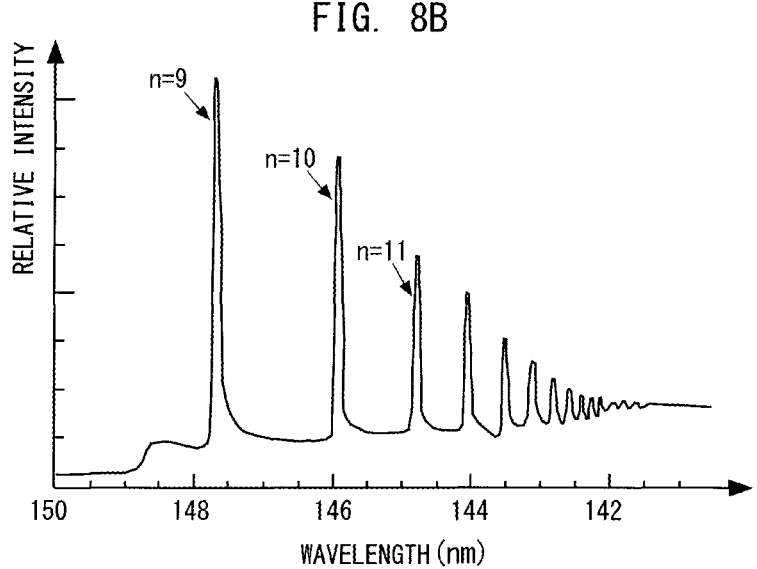
FIG. 8A illustrates, in a case where palladium atoms are directly excited to a level in which n is 9 or more, theoretical values including the probability of ionization of the palladium atoms at each level.
FIG. 8B illustrates publicly-known measured data including the intensity of palladium ions generated in a case where palladium atoms were excited to each level.

FIG. 8A illustrates theoretical values including the probability of ionization of palladium atoms at each level. FIG. 8A illustrates, when the probability that the palladium atoms excited to the level at which n is 9 ionizes automatically, is defined as 1, relative values of the ionization probability of the palladium atoms at the other levels. The probability that palladium isotopes at the level having n, ionizes automatically, is proportional to 1/n$^3$ in theory.

FIG. 8B illustrates publicly-known measured data indicating the intensity of palladium ions generated in a case where palladium atoms were excited to each level. FIG. 8B is based on data described in Non Patent Literature 3. The data of FIG. 8B indicates, by onetime excitation, the level of the palladium atoms migrated from a ground level to each level at which n was 9 or more. In FIG. 8B, the horizontal axis represents the wavelength of a laser beam with which a substance including the palladium atoms was irradiated. Here, the intensity of the laser beam is constant in wavelength. In FIG. 8B, the vertical axis represents the intensity (amount) of the palladium ions generated by the irradiation of the laser beam. If FIG. 8B, peaks indicated with arrows denoted with n=9, n=10, and n=11, indicate the ion intensities of the palladium atoms excited from the ground level to the levels having n=9, n=10, and n=11, respectively. The result of FIG. 8B agrees with the theoretical values of FIG. 8A. That is, as in theory, the ion intensity of the palladium isotopes excited to the level having n=9, is highest in FIG. 8B.
(Ionization with Three-Stage Excitation)

Figure 9:
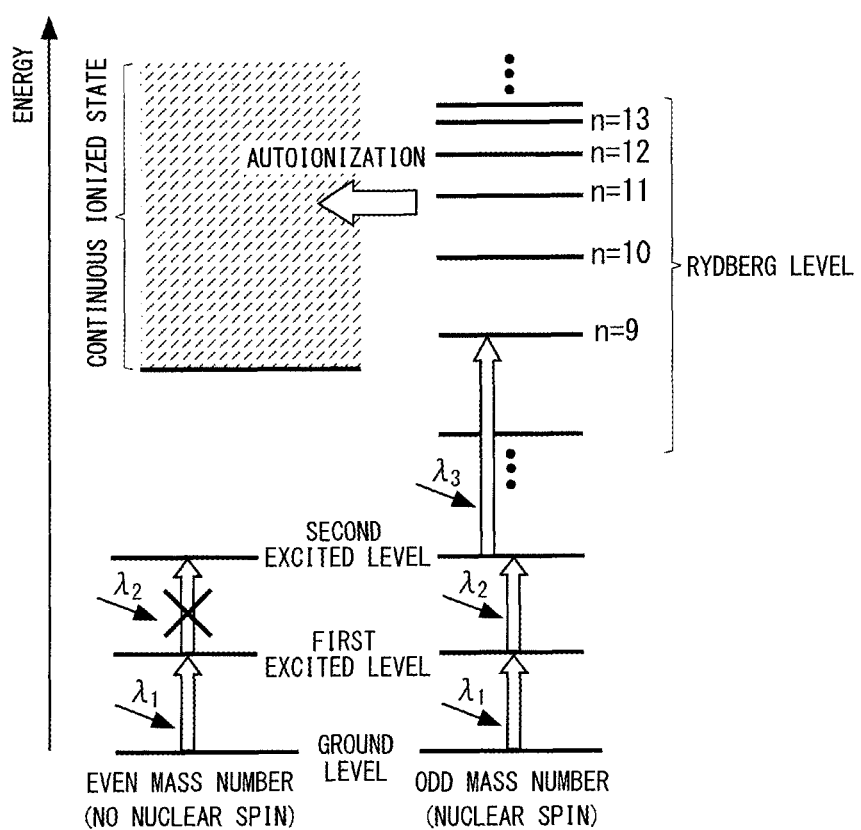
FIG. 9 is an explanatory diagram in a case where palladium isotopes having an odd mass number are excited at three stages by an ionization method according to the second embodiment of the present invention.

FIG. 9 is an explanatory diagram in a case where palladium isotopes having an odd mass number in a palladium-containing substance, are selectively excited at three stages so as to be ionized. The three-stage excitation includes excitation from the ground level to a first excited level, excitation from the first excited level to a second excited level, and excitation from the second excited level to a level in which n is 9 or more.

For the excitation from the ground level to the first excited level, the palladium-containing substance is irradiated with a first laser beam in which the wavelength $\lambda_1$ is 276.3 nm, the first laser beam being left-circularly polarized. At this time, as illustrated in FIG. 9, the palladium isotopes having an even mass number are also excited to the first excited level, in addition to the palladium isotopes having an odd mass number.

For the excitation from the first excited level to the second excited level, the palladium-containing substance is irradiated with a second laser beam in which the wavelength $\lambda_2$ is 521.0 nm, the second laser beam being left-circularly polarized (a left turn when viewed in the travel direction of the beam, the same applying hereinafter). At this time, as illustrated in FIG. 9, the palladium isotopes having an odd mass number are selectively excited to the second excited level, from the palladium isotopes having an odd mass number and the palladium isotopes having an even mass number. That is, at this time, the palladium isotopes having an even mass number are not substantially excited from the first excited level to the second excited level.

This is because the palladium isotopes having an odd mass number, each have a nuclear spin. The nuclear spin acts on the electron orbit of the palladium atom in each of the palladium isotopes having an odd mass number, so that a fine structure occurs at the energy levels. The fine structure allows the palladium isotopes having an odd mass number to be selectively excited from the first excited level to the second excited level.

For the excitation from the second excited level to the level in which n is 9 or more, the palladium-containing substance is irradiated with a third laser having the wavelength $\lambda_3$ corresponding to the excitation. Here, the third laser beam does not need to be circularly polarized.

The palladium-containing substance is irradiated simultaneously with the first, second and third laser beams, so that the palladium isotopes having an odd mass number are selectively excited to the level at which n is 9 or more, at the three stages.
(Experiment)

The inventors of the present application experimented in the three-stage excitation as follows. A natural palladium-containing substance was prepared. The palladium-containing substance includes $^{104}$Pd, $^{105}$Pd, $^{106}$Pd, $^{108}$Pd, and $^{110}$Pd, but does not include radioactive $^{107}$Pd. Three dye laser devices irradiated the natural palladium-containing substance simultaneously with the first, second, and third laser beams. At this time, the intensity (number) of generated palladium ions was measured.

The wavelength of the first laser beam was a constant value (276.3 nm) in order to excite the palladium isotopes from the ground level to the first excited level.

The wavelength of the second laser beam was a constant value (521.0 nm) in order to the palladium isotopes from the first excited level to the second excited level.

The wavelength of the third laser beam was changed in value. That is, the palladium-containing substance was irradiated simultaneously with the first, second, and third laser beams, the wavelengths of the first and second laser beams remaining constant, the wavelength of the third laser beam varying. At this time, the intensity of the palladium ions was measured at each wavelength of the third laser beam.

Figures 10A, 10B:
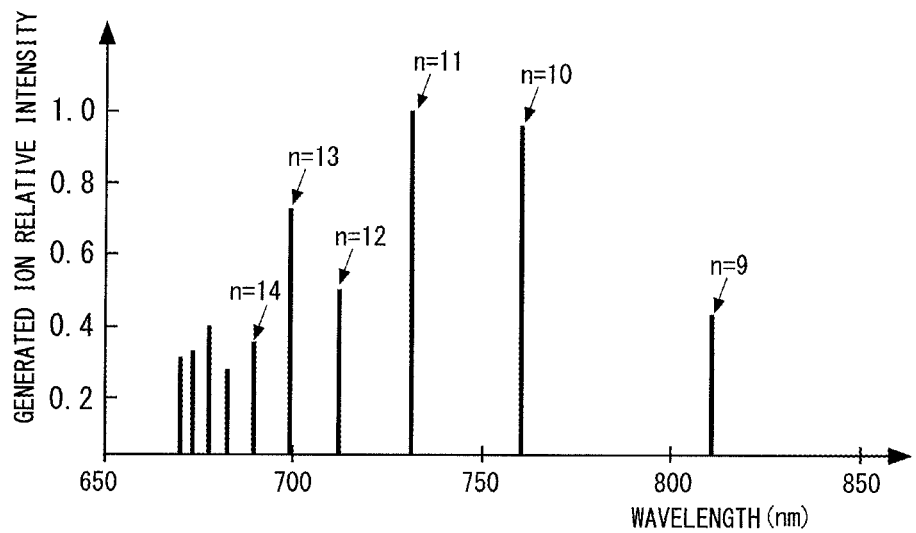
FIG. 10A illustrates a measured result of the intensity of palladium ions generated in case where palladium isotopes having an odd mass number were excited at the three stages.
FIG. 10B is a table quantifying the result of FIG. 10A.

FIG. 10A illustrates a measured result of the intensity of the palladium ions generated in this experiment. In FIG. 10A, the horizontal axis represents the wavelength of the third laser beam with which the palladium-containing substance was irradiated. The vertical axis represents the intensity (detected number) of the palladium ions generated by the irradiation of the first to third laser beams. In FIG. 10A, locations indicated with arrows denoted with n=9 to n=14, indicate the ion intensities of the palladium isotopes excited to the levels having n=9 to n=14, respectively.

FIG. 10B is a table quantifying the result of FIG. 10A.

As can be seen from FIGS. 10A and 10B, in a case where the palladium isotopes were excited at the three stages from the ground level to the level in which the principal quantum number n was 9 or more, the experiment showed that the palladium isotopes excited to the level having n=10, 11, 12, or 13 ionized with higher frequency (probability) than the palladium isotopes excited to the level having n=9 ionized. Particularly, it can be seen that the palladium isotopes excited to the level having n=10 or 11 ionized with high probability more than two times (probability 2.23 or 2.33 times) as the ionization probability of the palladium isotopes excited to the level having n=9.

Figure 11A:
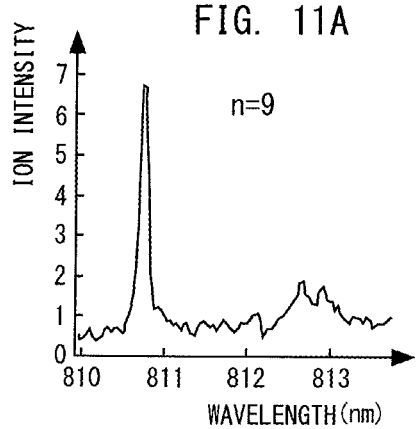
FIG. 11A is a partially enlarged graphical representation of FIG. 10A, illustrating the vicinity of a peak in ion intensity with n=9.
Figure 11B:
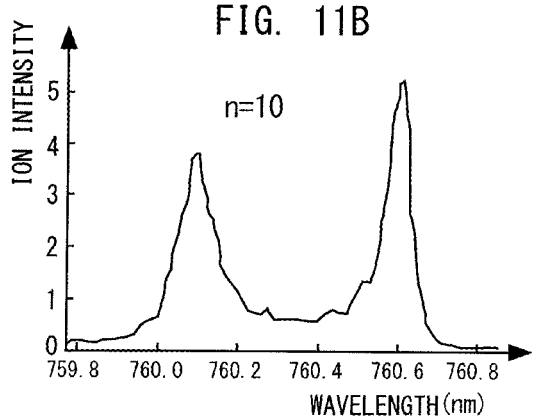
FIG. 11B is a partially enlarged graphical representation of FIG. 10A, illustrating the vicinity of a peak in ion intensity with n=10.
Figure 11C:
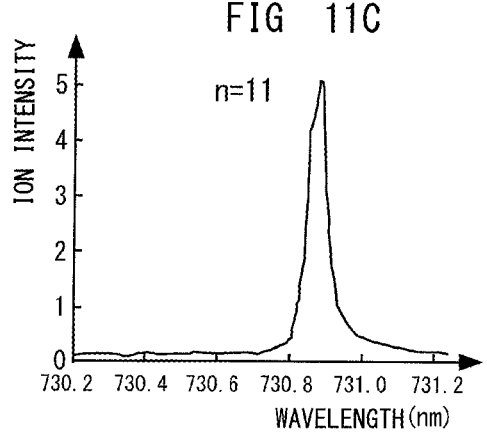
FIG. 11C is a partially enlarged graphical representation of FIG. 10A, illustrating the vicinity of a peak in ion intensity with n=11.
Figure 11D:
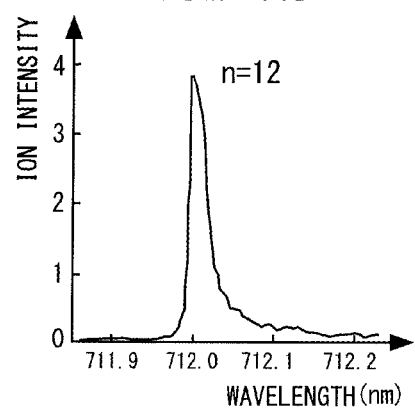
FIG. 11D is a partially enlarged graphical representation of FIG. 10A, illustrating the vicinity of a peak in ion intensity with n=12.
Figure 11E:
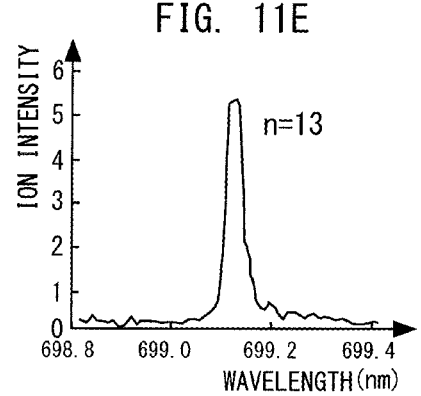
FIG. 11E is a partially enlarged graphical representation of FIG. 10A, illustrating the vicinity of a peak in ion intensity with n=13.

FIGS. 11A to 11E are partially enlarged graphical representations of FIG. 10A, and illustrate the ion intensities of the palladium isotopes excited to the levels having n=9, 10, 11, 12, and 13, respectively. The vertical axes of FIGS. 11A to 11E each represent the relative ion intensity. In FIG. 11B, two peaks exist. One peak occurs at 760.6 nm in wavelength, and the other peak occurs at 760.1 nm in wavelength. The ion intensities of the two peaks are 2.23 times and 1.77 times the ion intensity at a wavelength of 810.8 nm corresponding to n=9 (refer to FIG. 10B).

Note that the experimental results are for $^{105}$Pd, but the experimental results are applicable to $^{107}$Pd having the same nuclear spin as $^{105}$Pd has. That is, even if $^{105}$Pd is replaced with $^{107}$Pd and the other experimental conditions remain the same in the experiment, similar results to the results of FIGS. 10A, 10B, and 11A to 11E can be acquired.

(Configuration of Ionization Device)

Figure 12:
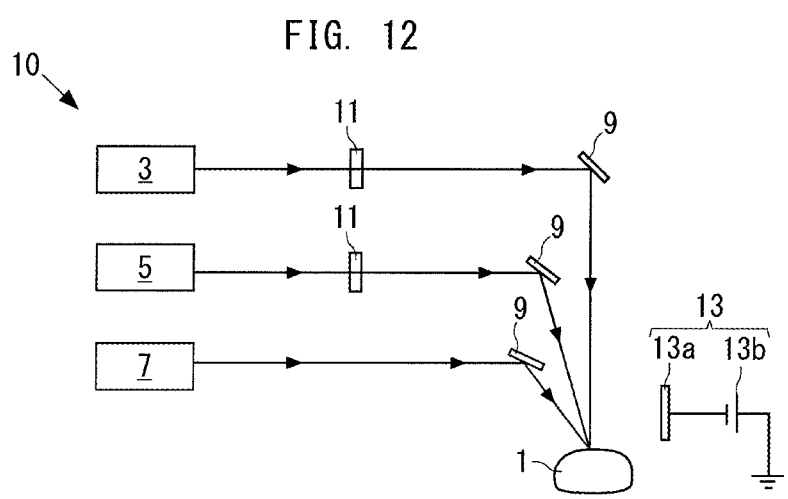
FIG. 12 is a schematic diagram of an even-odd separation and ionization device of palladium isotopes, according to the second embodiment of the present invention.

FIG. 12 is a schematic diagram of the even-odd separation and ionization device of palladium isotopes 10 according to the second embodiment of the present invention. The ionization device 10 selectively ionizes palladium isotopes having an odd mass number in a palladium-containing substance 1 including a plurality of types of palladium isotopes. Particularly, the ionization device 10 excites the palladium isotopes at the three stages to the level in which n is 10, 11, 12, or 13, on the basis of the experimental results described above. The palladium-containing substance 1 is spent nuclear fuel used in power generation of a nuclear power plant (namely, radioactive waste) as an example, and may be a natural substance or a different substance.

The ionization device 10 includes a first, second, and third laser irradiating devices 3, 5, and 7. The first laser irradiating device 3 irradiates the palladium-containing substance 1 with the first laser beam having the first wavelength. The second laser irradiating device 5 irradiates the palladium-containing substance 1 with the second laser beam having the second wavelength. The third laser irradiating device 7 irradiates the palladium-containing substance 1 with the third laser beam having the third wavelength. This configuration allows the first, second, and third laser irradiating devices 3, 5, and 7 to irradiate the same position or range of the palladium-containing substance 1 simultaneously with the first, second, and third laser beams, respectively. The palladium-containing substance 1 to be irradiated with the laser beams may be a solid or gas. For gas, the palladium-containing substance 1 may be vaporized in a container by a heating device.

The first wavelength is 276.3 nm and the second wavelength is 521.0 nm. The third wavelength is either 760.1 nm or 760.6 nm, 730.9 nm, 712.0 nm, or 699.1 nm. Preferably, the third wavelength is 760.6 nm or 730.9 nm. More preferably, the third wavelength is 730.9 nm.

In a case where the third wavelength is either 760.1 nm or 760.6 nm, or 730.9 nm, the first, second, and third laser irradiating devices 3, 5, and 7 each may be a titanium-sapphire-crystal solid-state laser device. That is, the solid-state laser device is capable of emitting the laser beam having a wavelength of either 760.1 nm or 760.6 nm, or 730.9 nm at a high power.

Figure 13:
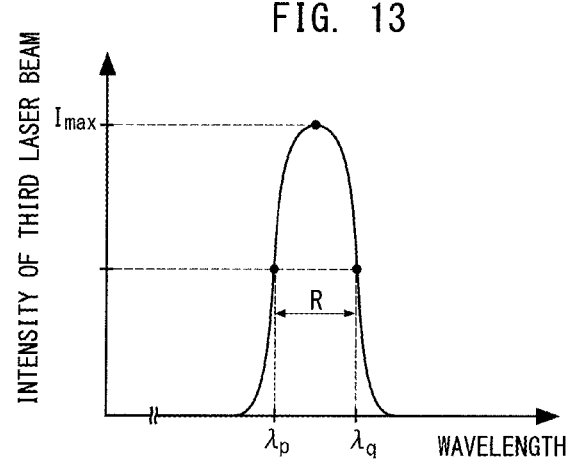
FIG. 13 illustrates an exemplary intensity distribution of a third laser beam.

FIG. 13 illustrates an exemplary intensity distribution of the third laser beam with which the third laser irradiating device 7 irradiates the palladium-containing substance 1. The intensity distribution is as a function of wavelength. In FIG. 13, the horizontal axis represents the wavelength of the third laser beam, and the vertical axis represents the intensity of the third laser beam at each wavelength. In FIG. 13, the intensity of the third laser beam is not less than 50% of a maximum value $I_{max}$ in the intensity (preferably 75% or more, and more preferably 90% or more) at any wavelength in a wavelength range R from a wavelength λp to a wavelength λq. Note that the intensity of the third laser beam has the maximum value $I_{max}$ in the wavelength range R in FIG. 13. The value in difference between λp and λq (namely, the width of the wavelength range R) may be 0.6 nm or more and 1.5 nm or less (e.g., approximately 1 nm).

The third wavelength described above is included in the wavelength range R. That is, in the present application, the third laser beam having the third wavelength means that the third wavelength is included in the wavelength range R. In the present application, the wavelength of the third laser beam (third wavelength) having a specific value (namely, either 760.1 nm or 760.6 nm, 730.9 nm, 712.0 nm, or 699.1 nm) means that the specific value is included in the wavelength range R.

Note that, for example, out of the wavelength range R and in a range of a wavelength not less than 1 nm smaller than the wavelength λp, the intensity of the third laser beam has a value of zero or a value close to zero at any wavelength. Similarly, for example, out of the wavelength range R and in a range of a wavelength not less than 1 nm larger than the wavelength λq, the intensity of the third laser beam has a value of zero or a value close to zero at any wavelength.

In a case where the palladium isotopes are excited to the level having n=10, the wavelength range R has a width of 1.5 nm or less, and the wavelength range R includes either 760.1 nm or 760.6 nm or both 760.1 nm and 760.6 nm. 760.1 nm and 760.6 nm are the wavelengths at which the two peaks exist in FIG. 11B. In a case where the wavelength range R includes both 760.1 nm and 760.6 nm, λp is preferably smaller than 760.1 nm (more exactly 760.10 nm) and λq is preferably larger than 760.6 nm (more exactly 760.60 nm). This arrangement enables the palladium isotopes to be efficiently excited to the level having n=10.

Note that the first laser beam having the first wavelength (276.3 nm) may have substantially intensity in a range of 276.25 nm or more and 276.34 nm or less in wavelength. For example, the intensity of the first laser beam may be zero at any wavelength out of the range.

Similarly, the first laser beam having the second wavelength (521.0 nm) may have substantially intensity in a range of 520.95 nm or more to 521.04 nm or less in wavelength. For example, the intensity of the second laser beam may be zero at any wavelength out of the range.

The ionization device 10 preferably includes guide optical elements 9 and polarization optical elements 11.

The guide optical elements 9 guide the first, second, and third laser beams emitted from the first, second, and third laser irradiating device 3, 5, and 7, respectively, to the same position or range of the palladium-containing substance 1. In the example of FIG. 12, the guide optical elements 9 include a plurality of reflective mirrors, but may have different configurations.

The polarization optical elements 11 irradiate the palladium-containing substance 1 with the first and second laser beams left-circularly polarized or left-elliptically polarized. In the example of FIG. 12, because the laser beams emitted from the laser irradiating devices 3 and 5 are linearly polarized, the polarization optical elements 11 may be respective quarter-wave plates 11 through which the first and second laser beams pass. That is, the first and second laser beams linearly polarized pass through the respective quarter-wave plates 11, so that the first and second laser beams are left-circularly polarized or left-elliptically polarized. This arrangement allows the palladium-containing substance 1 to be irradiated with the first and second laser beams left-circularly polarized or left-elliptically polarized. Note that the polarization optical elements 11 are not necessarily the quarter-wave plates.

The ionization device 10 preferably includes an electric-field applying device 13 that applies an electric field to the palladium-containing substance 1. The electric-field applying device 13 includes an electrode 13a and a power source 13b. The electrode 13a is preferably disposed in proximity to the palladium-containing substance 1. The power source 13b applies potential lower than the potential of the palladium-containing substance 1 (e.g., negative potential) to the electrode 13a. This arrangement allows the electrode 13a to apply the electric field to the palladium-containing substance 1. As a result, the palladium ions generated in the palladium-containing substance 1 are attracted by the electrode 13a, to be accumulated on the electrode 13a.

(Ionization Method)

A method for even-odd separation and ionization of palladium isotopes according to the second embodiment of the present invention, will be described. The method is performed by the ionization device 10 described above.

The first to third laser irradiating devices 3, 5, and 7 irradiate the same position or range of the palladium-containing substance 1 simultaneously with the first, second, and third laser beams, respectively. This arrangement allows the palladium isotopes having an odd mass number from the plurality of types of palladium isotopes included in the palladium-containing substance 1, to be selectively excited at the three stages to the level in which the principal quantum number n is 10, 11, 12, or 13, so that the palladium isotopes having an odd mass number automatically ionize, as described above. That is, the palladium ions being cations are generated.

At this time, preferably, the electric-field applying device 13 applies the electric field to the palladium-containing substance 1. That is, the power source 13b applies the potential lower than the potential of the palladium-containing substance 1, to the electrode 13a. This arrangement allows the palladium isotopes ionized by the first to third laser irradiating devices 3, 5, and 7 (palladium cations), to be separated from the palladium-containing substance 1, with the electric field generated by the electrode 13a. The separated palladium ions adsorb onto the electrode 13a of the electric-field applying device 13. Therefore, the palladium ions can be accumulated on the electrode 13a.

In a case where the palladium-containing substance 1 is spent nuclear fuel, for example, radioactive palladium isotopes $^{107}$Pd and stable palladium isotopes $^{105}$Pd are separated from the palladium-containing substance 1, so as to be accumulated on the electrode 13a. This arrangement can reduce the dose of the spent nuclear fuel. In a case where the palladium-containing substance 1 is a natural substance including no $^{107}$Pd, palladium isotopes $^{105}$Pd are separated from the palladium-containing substance 1, so as to be accumulated on the electrode 13a, so that the accumulated $^{105}$Pd can be utilized as a resource.

(Effect According to Second Embodiment)

The first laser beam excites the palladium isotopes having an odd mass number and the palladium isotopes having an even mass number, from the ground level to the first excited level. The second laser beam selectively excites the palladium isotopes having an odd mass number, from the first excited level to the second excited level. The third laser beam excites the palladium isotopes having an odd mass number, from the second excited level to the level at which the principal quantum number n is 10, 11, 12, or 13. In this manner, the palladium isotopes excited, at the three stages, to the level at which n is 10, 11, 12, or 13, automatically ionize with high probability.

In this respect, during the three-stage excitation, the palladium isotopes excited to the Rydberg level at which n is 10, 11, 12, or 13 ionize with higher probability than the palladium isotopes excited to the Rydberg level at which n is 9.

Therefore, palladium isotopes having an odd mass number are separated from a substance including a plurality of types of palladium isotopes, and the palladium isotopes having an odd mass number can be ionized efficiently.

Third Embodiment

An ionization method according to a third embodiment of the present invention, includes selectively ionizing palladium isotopes having an odd mass number from a palladium-containing substance including a plurality of types of palladium isotopes. The same descriptions in the third embodiment as in the first embodiment, will be omitted below. For example, the meanings of the same terms and symbols below as used in the first embodiment, are the same as in the first embodiment.

(Ionization with Two-Stage Excitation)

Figure 14:
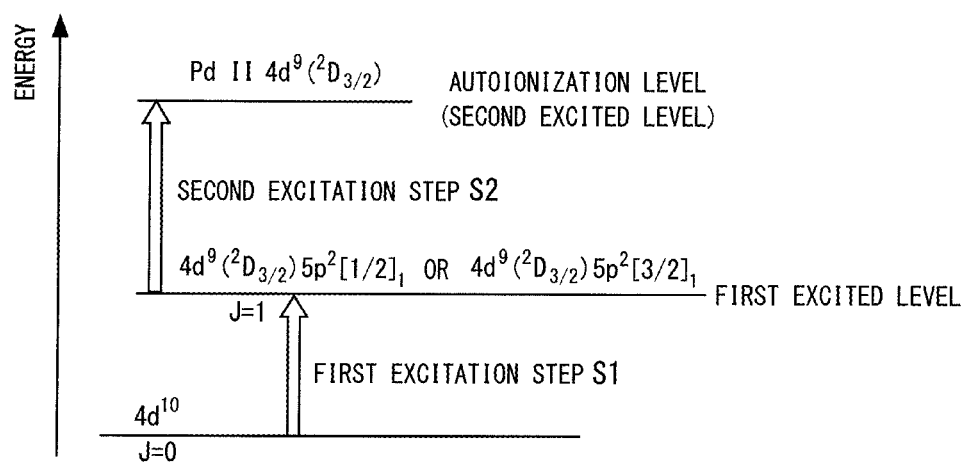
FIG. 14 is an explanatory diagram in a case where palladium isotopes having an odd mass number are excited to an autoionization level at two stages by an ionization method according to a third embodiment.

FIG. 14 is an explanatory diagram in a case where palladium isotopes having an odd mass number are excited to an autoionization level at two stages by the ionization method according to the third embodiment. The two-stage excitation include excitation from a ground level to a first excited level and excitation from the first excited level to a second excited level. Although the second excited level is not the autoionization level in the first embodiment described above, the second excited level is the autoionization level in the third embodiment.

As illustrated in FIG. 14, the ionization method according to the third embodiment includes first and second excitation steps S1 and S2 indicated with two solid line arrows. According to the third embodiment, the palladium-containing substance is irradiated with first and second laser beams having first and second wavelengths, respectively, so that the first and second excitation steps S1 and S2 occur. According to the third embodiment, the first and second laser beams each are linearly polarized at least when the palladium-containing substance is irradiated with the first and second laser beams.

In this respect, the first and second wavelengths are selected in order to satisfy the following (1) to (3).

(1) The second excited level is the autoionization level.

(2) Substantially only the palladium isotopes having an odd mass number from the plurality of types of palladium isotopes, are selectively excited to the second excited level. That is, the palladium isotopes having an even mass number are not substantially excited to the second excited level even when having been excited to the first excited level.

(3) The ion core state of each of the palladium isotopes having an odd mass number at the second excited level, is the same as the ion core state of each of the palladium isotopes having an odd mass number excited to the first excited level.

<Exemplary Two-Stage Excitation 1>

Exemplary two-stage excitation 1 according to the third embodiment, will be described on the basis of FIG. 15.

Figure 15:
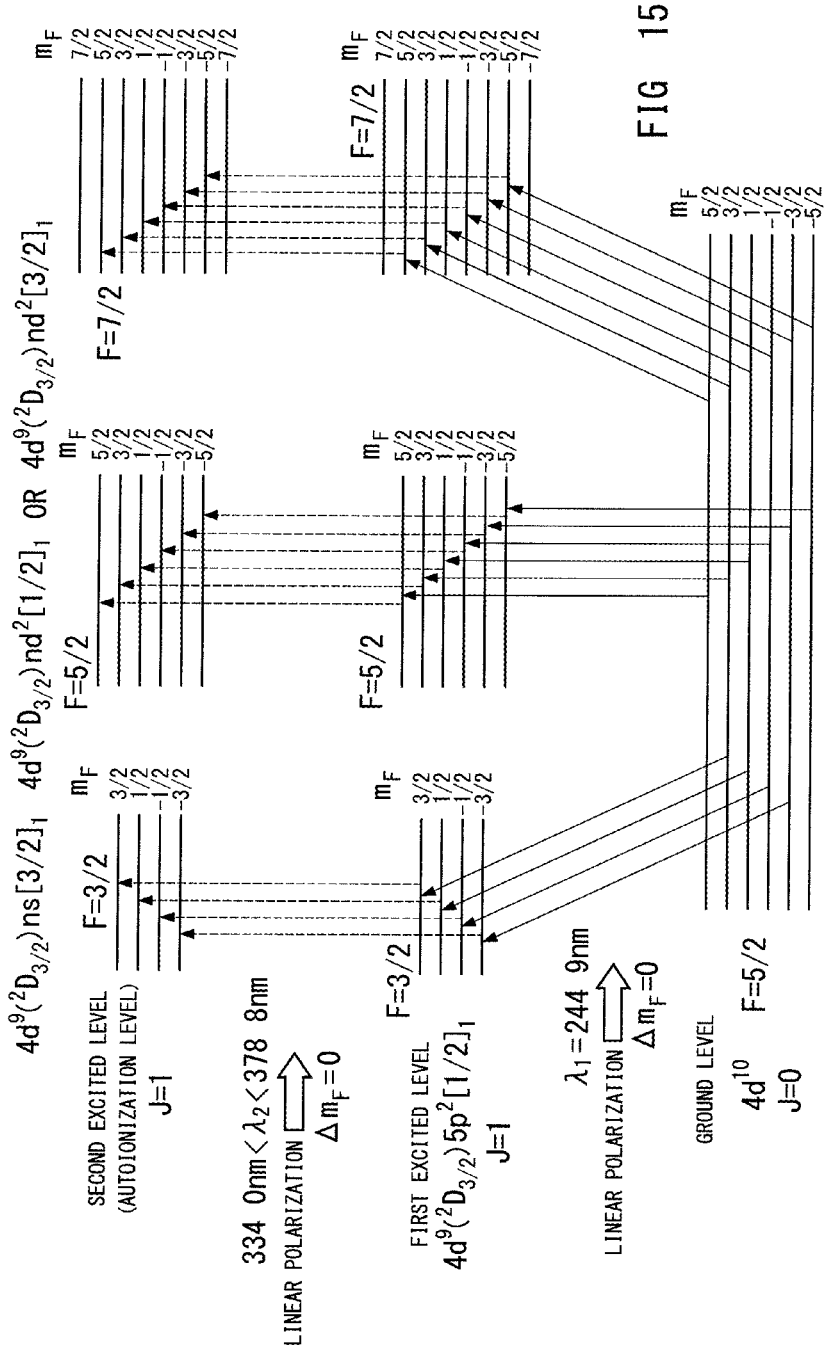
FIG. 15 illustrates an energy-level fine structure in which each palladium isotope having an odd mass number transitions, for exemplary two-stage excitation 1.

FIG. 15 illustrates an energy-level fine structure in which each of the palladium isotopes having an odd mass number transitions, for the exemplary two-stage excitation 1. In FIG. 15, the first wavelength $\lambda_1$ of the first laser beam is 244.9 nm, and the second wavelength $\lambda_2$ of the second laser beam is a specific value satisfying the following expression: $334.0 < \lambda_2 < 378.8$ nm.

The first excited level in FIG. 15 is a level to which the first laser beam excites each palladium isotope having an odd mass number at the ground level, and is expressed with $4d^9(^2D_{3/2})5p^2[1/2]_1$.

The second excited level (namely, the autoionization level) in FIG. 15 is a level to which the second laser beam excites each palladium isotope having an odd mass number at the first excited level in FIG. 15. The autoionization level is any of three levels expressed with $4d^9(^2D_{3/2})ns[3/2]_1$, $4d^9(^2D_{3/2})nd^2[1/2]_1$, and $4d^9(^2D_{3/2})nd^2[3/2]_1$.

The autoionization level becomes one of the three levels, depending on the specific value of the wavelength $\lambda_2$.

In FIG. 15, in the palladium-containing substance irradiated with the first and second laser beams linearly polarized, the polarized direction of the first laser beam is parallel to the polarized direction of the second laser beam. This arrangement allows the z component $m_F$ of F not to vary in the excitation from the first excited level to the second excited level ($\Delta m_F=0$), as illustrated in FIG. 15.

Four fine levels, six fine levels, and eight fine levels exist for F=3/2, F=5/2, and F=7/2, respectively, at the first excited level (J=1) of FIG. 15. Four fine levels, six fine levels, and eight fine levels exist for F=3/2, F=5/2, and F=7/2, respectively, at the second excited level (J=1) of FIG. 15.

In FIG. 15, for each palladium isotope having an odd mass number, the excitation from the ground level to the first excited level is indicated with any of solid line arrows, and the excitation from the first excited level to the second excited level is indicated with any of broken line arrows (This is applicable to FIGS. 16 to 18 to be described later).

<Exemplary Two-Stage Excitation 2>

Exemplary two-stage excitation 2 according to the third embodiment, will be described on the basis of FIG. 16.

Figure 16:
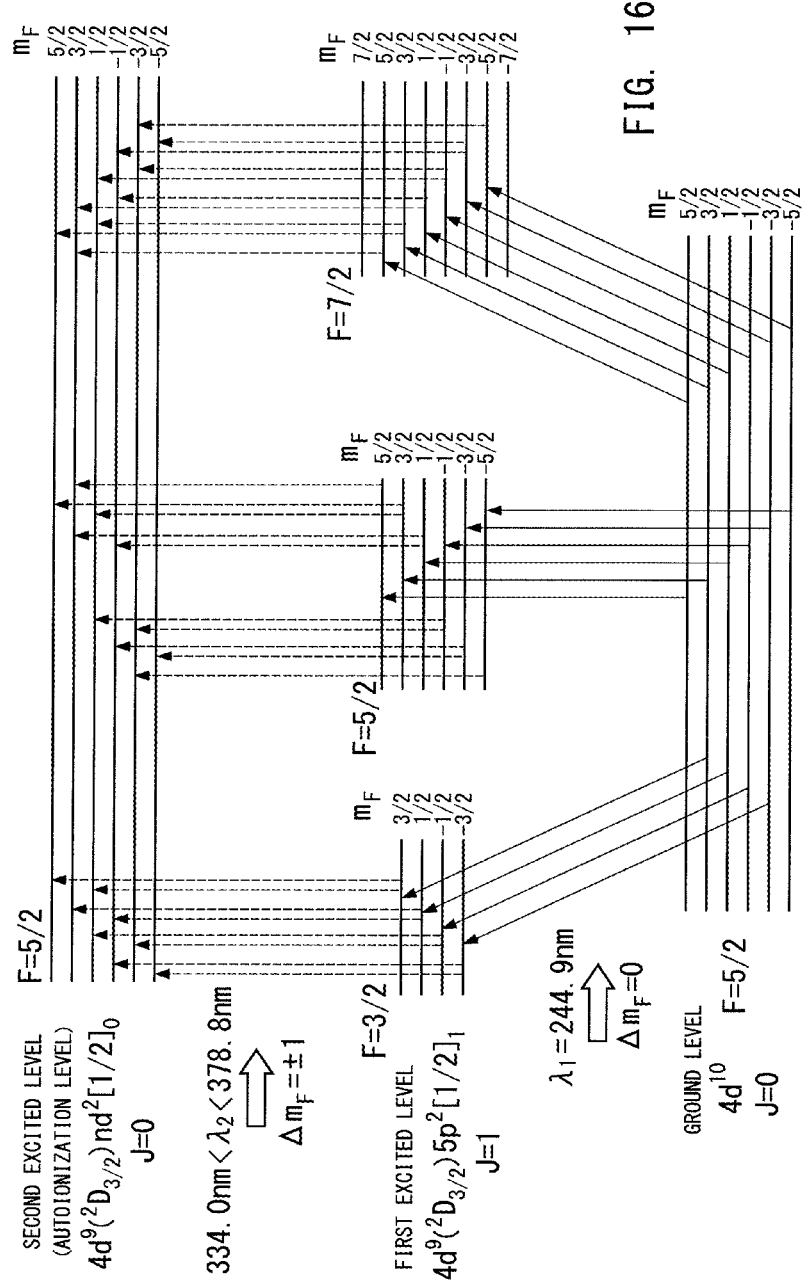
FIG. 16 illustrates an energy-level fine structure in which each palladium isotope having an odd mass number transitions, for exemplary two-stage excitation 2.

FIG. 16 illustrates an energy-level fine structure in which each of the palladium isotopes having an odd mass number transitions, for the exemplary two-stage excitation 2. In FIG. 16, the first wavelength $\lambda_1$ of the first laser beam is 244.9 nm, and the second wavelength $\lambda_2$ of the second laser beam is a specific value satisfying the following expression: $334.0 < \lambda_2 < 378.8$ nm.

The first excited level in FIG. 16 is the same as in FIG. 15. Meanwhile, the second excited level (namely, the autoionization level) in FIG. 16 is a level to which the second laser beam excites the palladium isotopes having an odd mass number at the first excited level in FIG. 16. The autoionization level is expressed with $4d^9(^2D_{3/2})nd^2[1/2]$).

In FIG. 16, in the palladium-containing substance irradiated with the first and second laser beams linearly polarized, the polarized direction of the first laser beam is orthogonal to the polarized direction of the second laser beam. This arrangement allows the z component $m_F$ of F to vary by 1 in the excitation from the first excited level to the second excited level ($\Delta m_F=\pm 1$), as illustrated in FIG. 16.

One type of value of the total angular momentum F to be acquired at the second excited level (J=0, $4d^9(^2D_{3/2})nd^2[1/2]_0$) of FIG. 16, is 5/2. Therefore, six fine levels exist at the second excited level.

<Exemplary Two-Stage Excitation 3>

Exemplary two-stage excitation 3 according to the third embodiment, will be described on the basis of FIG. 17.

Figure 17:
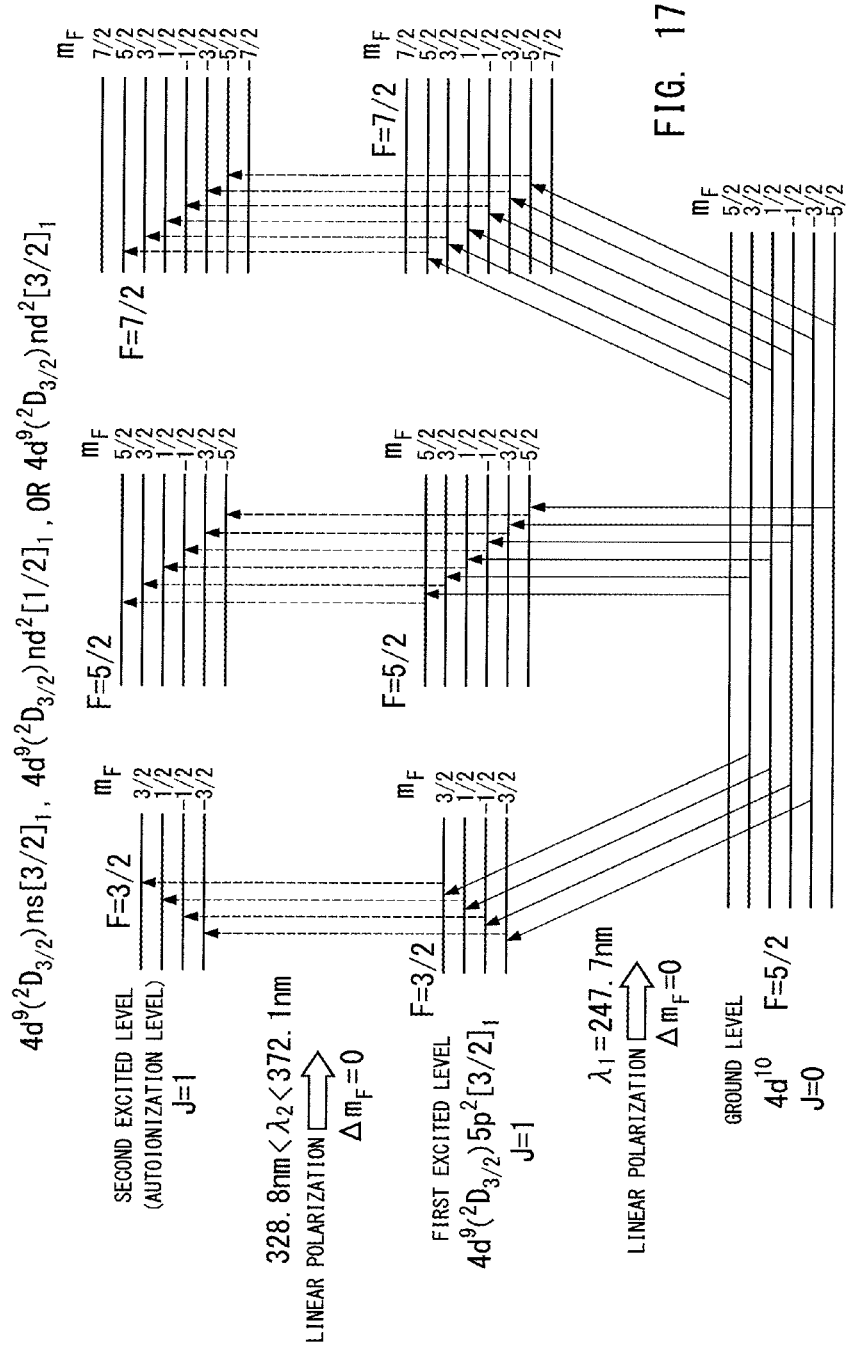
FIG. 17 illustrates an energy-level fine structure in which each palladium isotope having an odd mass number transitions, for exemplary two-stage excitation 3.

FIG. 17 illustrates an energy-level fine structure in which each of the palladium isotopes having an odd mass number transitions, for the exemplary two-stage excitation 3. In FIG. 17, the first wavelength $\lambda_1$ of the first laser beam is 247.7 nm, and the second wavelength $\lambda_2$ of the second laser beam is a specific value satisfying the following expression: $328.8 < \lambda_2 < 372.1$ nm.

The first excited level in FIG. 17 is a level to which the first laser beam excites each palladium isotope having an odd mass number at the ground level, and is expressed with $4d^9(^2D_{3/2})5p^2[3/2]_1$.

The second excited level (namely, the autoionization level) in FIG. 17 is the same as in FIG. 15.

In FIG. 17, in the palladium-containing substance irradiated with the first and second laser beams linearly polarized, the polarized direction of the first laser beam is parallel to the polarized direction of the second laser beam. This arrangement allows the z component $m_F$ of F not to vary in the excitation from the first excited level to the second excited level ($\Delta m_F=0$), as illustrated in FIG. 17.

Four fine levels, six fine levels, and eight fine levels exist for F=3/2, F=5/2, and F=7/2, respectively, at the first excited level (J=1) of FIG. 17.

<Exemplary Two-Stage Excitation 4>

Exemplary two-stage excitation 4 according to the third embodiment, will be described on the basis of FIG. 18.

FIG. 18 illustrates an energy-level fine structure in which each of the palladium isotopes having an odd mass number transitions, for the exemplary two-stage excitation 4. In FIG. 18, the first wavelength $\lambda_1$ of the first laser beam is 247.7 nm, and the second wavelength $\lambda_2$ of the second laser beam is a specific value satisfying the following expression: $328.8 < \lambda_2 < 372.1$ nm.

The first excited level in FIG. 18 is the same as in FIG. 17. Meanwhile, the second excited level (namely, the autoionization level) in FIG. 18 is the same as in FIG. 16.

In FIG. 18, in the palladium-containing substance irradiated with the first and second laser beams linearly polarized, the polarized direction of the first laser beam is orthogonal to the polarized direction of the second laser beam. This arrangement allows the z component $m_F$ of F to vary by 1 in the excitation from the first excited level to the second excited level ($\Delta m_F=\pm 1$), as illustrated in FIG. 18.

(Configuration of Ionization Device)

Figure 19A:
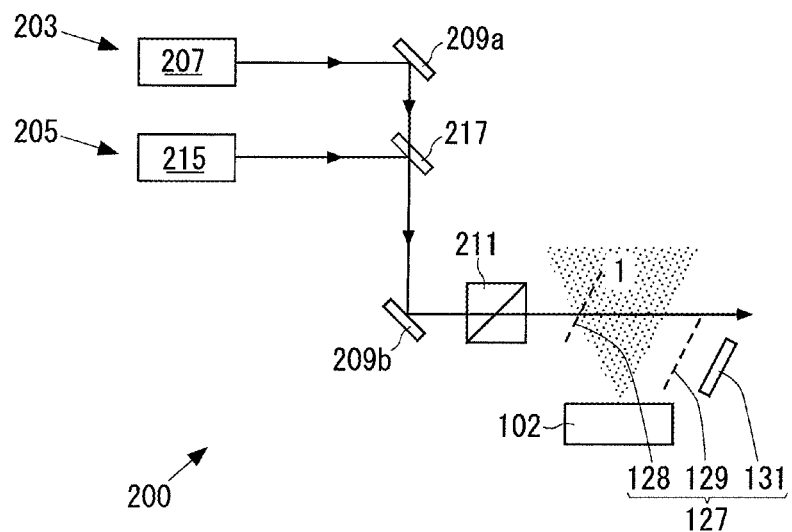
FIG. 19A illustrates an exemplary configuration 1 of an ionization device according to the third embodiment.
Figure 19B:
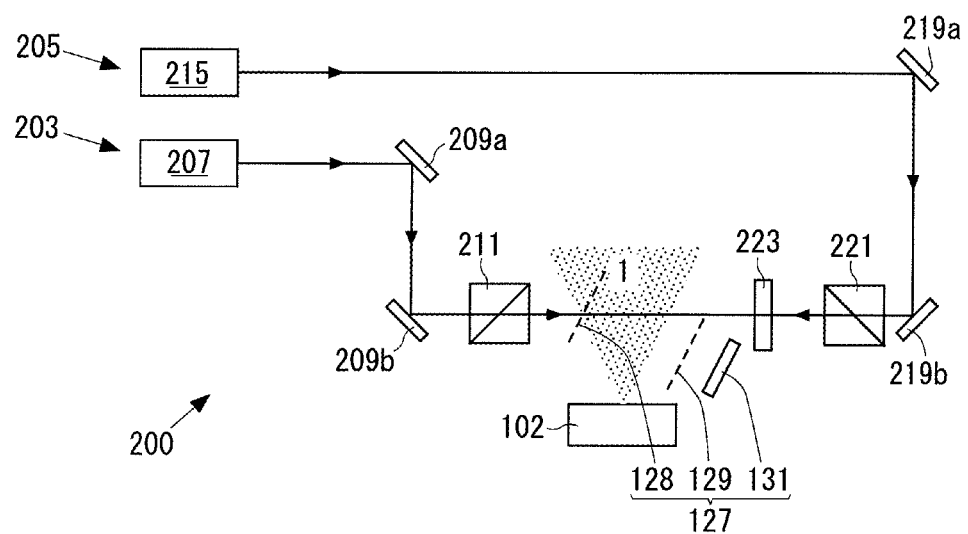
FIG. 19B illustrates an exemplary configuration 2 of the ionization device according to the third embodiment.

FIGS. 19A and 19B each illustrate an exemplary configuration of an ionization device 200 according to the third embodiment. The ionization method according to the third embodiment described above may be performed by the ionization device 200. The ionization device 200 includes a first laser irradiating device 203 and a second laser irradiating device 205. The first laser irradiating device 203 generates the first laser beam, and irradiates a palladium-containing substance 1 with the first laser beam linearly polarized. The second laser irradiating device 205 generates the second laser beam, and irradiates the palladium-containing substance 1 with the second laser beam linearly polarized. The configuration and function of the palladium-containing substance 1, a crucible 102, and a collection device 127 in FIGS. 19A and 19B is the same as in FIG. 5.

<Exemplary Two-Stage Excitation 1 or 3>

The first laser irradiating device 203 and the second laser irradiating device 205 irradiate the same position of the palladium-containing substance 1 with the first laser beam and the second laser beam, respectively, the first laser beam and the second laser beam being linearly polarized, the polarized directions thereof being parallel to each other. This arrangement allows the exemplary two-stage excitation 1 of FIG. 15 or the exemplary two-stage excitation 3 of FIG. 17, to be achieved. The configuration of achieving the exemplary two-stage excitation 1 or 3 in this manner, will be described on the basis of FIG. 19A, but the configuration is not limited to FIG. 19A. For the configuration of achieving the exemplary two-stage excitation 1 (e.g., the exemplary configuration of FIG. 19A), the wavelength $\lambda_1$ of the first laser beam is 244.9 nm and the wavelength $\lambda_2$ of the second laser beam is a specific value satisfying the following expression: $334.0 < \lambda_2 < 378.8$ nm. For the configuration of achieving the exemplary two-stage excitation 3 (e.g., the exemplary configuration of FIG. 19A), the wavelength $\lambda_1$ of the first laser beam is 247.7 nm and the wavelength $\lambda_2$ of the second laser beam is a specific value satisfying the following expression: $328.8 < \lambda_2 < 372.1$ nm.

In FIG. 19A, the first laser irradiating device 203 includes a laser emitting unit 207, a plurality of mirrors 209a and 209b, and a polarizing element 211. The plurality of mirrors 209a and 209b reflects the first laser beam from the laser emitting unit 207, to guide the first laser beam to the palladium-containing substance 1. The polarizing element 211 is, for example, a polarizing prism, and improves the degree of linear polarization of the first laser beam linearly polarized, emitted from the laser emitting unit 207. That is, light that has passed through the polarizing element 211, is linearly polarized, the light being polarized in one direction.

The second laser irradiating device 205 includes: a laser emitting unit 215 that emits the second laser beam; and a mirror 217. The second laser beam from the laser emitting unit 215 is reflected by the mirror 217, so as to be incident on the mirror 209b. The mirror 217 is a dichroic mirror that reflects light having a specific wavelength and transmits light having the other wavelengths, therethrough. That is, the dichroic mirror 217 transmits the first laser beam therethrough and reflects the second laser beam. This arrangement allows the first and the second laser beams to overlap each other to propagate through the same path. Then, the first and second laser beams are reflected on the mirror 209b to pass through the polarizing element 211. The first and second laser beams are incident on the palladium-containing substance 1, the first and second laser beams being linearly polarized, the polarized directions thereof being parallel to each other.

<Exemplary Two-Stage Excitation 2 or 4>

The first laser irradiating device 203 and the second laser irradiating device 205 irradiate the same position of the palladium-containing substance 1 with the first laser beam and the second laser beam, respectively, the first laser beam and the second laser beam being linearly polarized, the polarized directions thereof being orthogonal to each other. This arrangement allows the exemplary two-stage excitation 2 of FIG. 16 or the exemplary two-stage excitation 4 of FIG. 18, to be achieved. The configuration of achieving the exemplary two-stage excitation 2 or 4 in this manner, will be described on the basis of FIG. 19B, but the configuration is not limited to FIG. 19B. For the configuration of achieving the exemplary two-stage excitation 2 (e.g., the exemplary configuration of FIG. 19B), the wavelength $\lambda_1$ of the first laser beam is 244.9 nm and the wavelength $\lambda_2$ of the second laser beam is a specific value satisfying the following expression: $334.0 < \lambda_2 < 378.8$ nm. For the configuration of achieving the exemplary two-stage excitation 4 (e.g., the exemplary configuration of FIG. 19B), the wavelength $\lambda_1$ of the first laser beam is 247.7 nm and the wavelength $\lambda_2$ of the second laser beam is a specific value satisfying the following expression: $328.8 < \lambda_2 < 372.1$ nm.

The configuration of the first laser irradiating device 203 in FIG. 19B is the same as in FIG. 19A.

The second laser irradiating device 205 includes the laser emitting unit 215, a plurality of mirrors 219a and 219b, a polarizing element 221, and a polarized-direction adjusting element 223.

The laser emitting unit 215 emits the second laser beam linearly polarized. The plurality of mirrors 219a and 219b reflects the second laser beam from the laser emitting unit 215, to guide the second laser beam to the position of the palladium-containing substance 1 to be irradiated with the first laser beam. The polarizing element 221 is, for example, a polarizing prism, and improves the degree of linear polarization of the second laser beam emitted from the laser emitting unit 215. That is, light that has passed through the polarizing element 221, is linearly polarized, the light being polarized in one direction. The polarized-direction adjusting element 223 changes the polarized direction of the second laser beam that has passed through the polarizing element 221. This arrangement allows the polarized direction of the second laser beam linearly polarized that has passed through the polarized-direction adjusting element 223, and the polarized direction of the first laser beam, to be orthogonal to each other at the position of the palladium-containing substance 1. The polarized-direction adjusting element 223 may be, for example, a half-wave plate.

Note that, for the exemplary two-stage excitation 2 or 4, the first laser irradiating device 203 and the second laser irradiating device 205 may irradiate the same position of the palladium-containing substance 1 with the first laser beam and the second laser beam circularly polarized or elliptically polarized, respectively. This arrangement enables the exemplary two-stage excitation 2 or 4 to be achieved. In this case, the first and second wavelengths $\lambda_1$ and $\lambda_2$ are the same as the above.

In the third embodiment, the first laser beam having the first wavelength $\lambda_1$ and the second laser beam having the second wavelength $\lambda_2$, may have substantially intensity in a wavelength range including the wavelength $\lambda_1$ and substantially intensity in a wavelength range including the wavelength $\lambda_2$, respectively. The width of each wavelength range may be 0.6 nm or more and 1.5 nm or less (e.g., approximately 0.1 nm). In this case, the laser beams each have a maximum value in intensity at a wavelength in the wavelength range, and the intensity at any wavelength in the wavelength range has a predetermined ratio or more to the maximum value (e.g., 50%, preferably 75%, and more preferably 90%). Note that the laser beams each may have a ratio smaller than the predetermined ratio to the maximum value, at any wavelength out of the wavelength range.

The second wavelength $\lambda_2$ can be specified by mass spectrometry in the exemplary two-stage excitation 1, 2, 3, or 4 described above. For example, in the exemplary two-stage excitation 1 or 2, the palladium-containing substance 1 is irradiated with the first and second laser beams, the wavelength $\lambda_2$ of the first laser beam being fixed to the first wavelength $\lambda_1$ described above, the wavelength of the second laser beam varying in a range from 334.0 to 378.8 nm. Mass spectrometry is performed to ions of the palladium isotopes generated in this manner, and then a mass spectral graph indicating the mass in the horizontal axis (or the value corresponding to the mass) and the ion intensity in the vertical axis is acquired for each wavelength value of the second laser beam. In a case where no peak in ion intensity occurs at a position in the horizontal axis indicating the mass of the palladium isotopes having an even mass number and a peak in ion intensity occurs at a position in the horizontal axis indicating the mass of the palladium isotopes having an odd mass number, in a mass spectral graph, the wavelength value of the second laser beam in this case is the second wavelength $\lambda_2$ for achieving the exemplary two-stage excitation 1 or 2 (namely, the specific value satisfying the following expression: 334.0<$\lambda_2$<378.8 nm). An example of the second wavelength acquired in this manner is 342.7 nm in FIG. 15 (exemplary two-stage excitation 1). Similarly, the second wavelength in the exemplary two-stage excitation 3 or 4 can be acquired.

(Effect According to Third Embodiment)

According to the third embodiment, the palladium isotopes having an odd mass number can be selectively excited with the two-stage excitation to the autoionization level, and thus the number of laser irradiating devices can be reduced from three to two in comparison to those according to the first embodiment and the second embodiment. Therefore, costs necessary for installation and maintenance of devices, can be reduced (to ⅔).

The first and second laser beams are allowed to overlap each other easily (e.g., the configuration of FIG. 19A). As a result, a multipath optical system that transmits the first and second laser beams through the palladium-containing substance 1 a plurality of times, can also be easily achieved. In this respect, each mirror included in the multipath optical system may be a mirror designed for two wavelengths (first and second wavelengths).

Furthermore, because the ion core state of each of the palladium isotopes having an odd mass number remains $^2D_{3/2}$ between the first excited level and the second excited level (autoionization level), the palladium isotopes having an odd mass number can be ionized at exceedingly high efficiency.

The present invention is not limited to the embodiments described above, and thus various alterations may be made without departing from the spirit of the present invention.

Note that a partial combination or the entire combination of the first embodiment, the second embodiment, and the third embodiment may be adopted if there is no conflict (or no contradiction) therebetween.

REFERENCE SIGNS LIST palladium-containing substance
first laser irradiating device
second laser irradiating device
third laser irradiating device
guide optical element (reflective mirror)
ionization device
polarization optical element (quarter-wave plate)
electric-field applying device
13a electrode
13b power source
102 crucible
103 first laser irradiating device
105 second laser irradiating device
107 laser emitting unit
109a, 109b mirror
110 selective excitation device of isotopes
111 polarizing element
113 polarized-direction adjusting element
115 laser emitting unit
117a, 117b mirror
119 polarizing element
100 ionization device
121 third laser irradiating device
123 laser emitting unit
125 mirror (dichroic mirror)
127 collection device
128 metal electrode
129 metal-gauze electrode
131 collection substrate
200 ionization device
203 first laser irradiating device
205 second laser irradiating device
207 laser emitting unit
209a, 209b mirror
211 polarizing element
215 laser emitting unit
217 mirror (dichroic mirror)
219a, 219b mirror
221 polarizing element
223 polarized-direction adjusting element

The invention claimed is:

1. A method for even-odd separation and ionization of palladium isotopes including: irradiating a palladium-containing substance including a plurality of types of palladium isotopes with laser beams having a plurality of wavelengths, to selectively ionize the palladium isotope having an odd mass number, a plurality of electrons, and a nucleus from the palladium-containing substance, the method comprising:
    a first excitation step of exciting the palladium isotope at a ground level to a first excited level with a first laser beam having a first wavelength; and
    a second excitation step of exciting the palladium isotope at the first excited level to a second excited level with a second laser beam having a second wavelength,
    wherein the first and second wavelengths are selected such that the first excitation step and the second excitation step selectively excite the palladium isotope having the odd mass number to the second excited level, and the second excited level becomes an autoionization level, the palladium isotope excited to the second excited level and having the odd mass number has an ion core state of $^2D_{3/2}$ and the ion core state remains $^2D_{3/2}$ between the first excited level and the second excited level, where an electron of the plurality of electrons is excited by light absorption, and
    the ion core of the palladium isotope means a combination of the nucleus and the plurality of electrons excluding the electron excited by the light absorption, and the ion core state means an arrangement state of the plurality of electrons in the ion core.

2. The method for even-odd separation and ionization of palladium isotopes according to claim 1, wherein a dichroic mirror transmits the first laser beam from a first laser emitting unit, and reflects the second laser beam from a second laser emitting unit such that the first and second laser beams overlap each other to propagate through a same path, a polarizing element is provided at the same path, and light that has passed through the polarizing element is linearly polarized in one direction, and the first and the second laser beams pass through the polarizing element to be incident on the palladium-containing substance in a state where the first and second laser beams are linearly polarized in directions parallel to each other.

3. The method for even-odd separation and ionization of palladium isotopes according to claim 1, wherein the palladium-containing substance is spent nuclear fuel including radioactive palladium isotopes $^{107}$Pd.

4. The method for even-odd separation and ionization of palladium isotopes according to claim 1, wherein the first wavelength $\lambda_1$ is 244.9 nm and the second wavelength $\lambda_2$ is a specific value satisfying 334.0 nm$<\lambda_2<$378.8 nm, the specific value allowing the second excited level to be the autoionization level, or the first wavelength $\lambda_1$ is 247.7 nm and the second wavelength $\lambda_2$ is a specific value satisfying 328.8 nm$<\lambda_2<$372.1 nm, the specific value allowing the second excited level to be the autoionization level.

5. The method for even-odd separation and ionization of palladium isotopes according to claim 4, wherein an identical position of the palladium-containing substance is irradiated with the first laser beam and the second laser beam linearly polarized, polarized directions of the first laser beam and the second laser beam being parallel to each other, or an identical position of the palladium-containing substance is irradiated with the first laser beam and the second laser beam linearly polarized, the polarized directions of the first laser beam and the second laser beam being orthogonal to each other, or with the first laser beam and the second laser beam circularly polarized or elliptically polarized.

6. An even-odd separation and ionization device of palladium isotopes configured to irradiate a palladium-containing substance including a plurality of types of palladium isotopes with laser beams having a plurality of wavelengths, to selectively ionize palladium isotope having an odd mass number, a plurality of electrons, and a nucleus from the palladium-containing substance, the even-odd separation and ionization device comprising:

a first laser irradiating device configured to irradiate the palladium-containing substance with a first laser beam having a first wavelength, to excite the palladium isotope at a ground level to a first excited level; and a second laser irradiating device configured to irradiate the palladium-containing substance with a second laser beam having a second wavelength, to excite the palladium isotope at the first excited level to a second excited level, wherein the first and second wavelengths are set such that the first and second laser beams selectively excite the palladium isotope having the odd mass number to the second excited level, and the second excited level becomes an autoionization level, the palladium isotope excited to the second excited level and having the odd mass number has an ion core state of $^2D_{3/2}$ and the ion core state remains $^2D_{3/2}$ between the first excited level and the second excited level, where an electron of the plurality of electrons is excited by light absorption, and the ion core of the palladium isotope means a combination of the nucleus and the plurality of electrons excluding the electron excited by the light absorption, and the ion core state means an arrangement state of the plurality of electrons in the ion core.

7. The even-odd separation and ionization device of palladium isotopes according to claim 6, wherein the palladium-containing substance is spent nuclear fuel including radioactive palladium isotopes $^{107}$Pd.

8. The even-odd separation and ionization device of palladium isotopes according to claim 6, wherein the first wavelength $\lambda_1$ is 244.9 nm and the second wavelength $\lambda_2$ is a specific value satisfying 334.0 nm$<\lambda_2<$378.8 nm, the specific value allowing the second excited level to be the autoionization level, or the first wavelength $\lambda_1$ is 247.7 nm and the second wavelength $\lambda_2$ is a specific value satisfying 328.8 nm$<\lambda_2<$372.1 nm, the specific value allowing the second excited level to be the autoionization level.

9. The even-odd separation and ionization device of palladium isotopes according to claim 8, wherein the first and second laser irradiating devices irradiate an identical position of the palladium-containing substance with the first laser beam and the second laser beam linearly polarized, polarized directions of the first laser beam and the second laser beam being parallel to each other, or the first and second laser irradiating devices irradiate an identical position of the palladium-containing substance with the first laser beam and the second laser beam linearly polarized, the polarized directions of the first laser beam and the second laser beam being orthogonal to each other, or with the first laser beam and the second laser beam circularly polarized or elliptically polarized.

10. The even-odd separation and ionization device of palladium isotopes according to claim 6, wherein the first laser irradiating device comprises a first laser emitting unit that emits the first laser, and a polarizing element wherein light that has passed through the polarizing element is linearly polarized in one direction, the second laser irradiating device comprises a second laser emitting unit that emits the second laser, and a dichroic mirror that transmits the first laser beam from the first laser emitting unit, and reflects the second laser beam from the second laser emitting unit such that the first and the second laser beams overlap each other to propagate through a same path, and the polarizing element is provided at the same path, and the first and the second laser beams pass through the polarizing element to be incident on the palladium-containing substance in a state where the first and second laser beams are linearly polarized in directions parallel to each other.

11. The even-odd separation and ionization device of palladium isotopes according to claim 6, wherein the first laser irradiating device comprises a first laser emitting unit that emits the first laser beam, and a first polarizing element that causes the first laser beam to be linearly polarized, the second laser irradiating device comprises a second laser emitting unit that emits the second laser, a second polarizing element that causes the second laser beam to be linearly polarized, and a polarized-direction adjusting element that changes a polarized direction of the second laser beam that has passed through the second polarizing element, to a direction orthogonal to a polarized direction of the first laser beam, and the first laser beam that has passed the first polarizing element and the second laser beam that has passed the polarized-direction adjusting element are incident on the palladium-containing substance with the first and second laser beams being linearly polarized in directions orthogonal to each other.

* * * * *